(12) United States Patent
Yoshikawa

(10) Patent No.: US 11,102,718 B2
(45) Date of Patent: Aug. 24, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Yuki Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/852,792

(22) Filed: Apr. 20, 2020

(65) Prior Publication Data

US 2020/0252864 A1  Aug. 6, 2020

Related U.S. Application Data

(63) Continuation of application No. PCT/JP2018/039299, filed on Oct. 23, 2018.

(30) Foreign Application Priority Data

Oct. 31, 2017  (JP) .............................. JP2017-211160

(51) Int. Cl.
| | |
|---|---|
| *H04W 4/00* | (2018.01) |
| *H04W 48/18* | (2009.01) |
| *H04W 8/00* | (2009.01) |
| *H04W 84/12* | (2009.01) |
| *H04W 88/06* | (2009.01) |

(52) U.S. Cl.
CPC ........... *H04W 48/18* (2013.01); *H04W 8/005* (2013.01); *H04W 84/12* (2013.01); *H04W 88/06* (2013.01)

(58) Field of Classification Search
USPC ................................ 370/338, 328, 329, 310
See application file for complete search history.

(56) References Cited

U.S. PATENT DOCUMENTS

| | | | | |
|---|---|---|---|---|
| 9,716,992 | B2* | 7/2017 | Abraham | ............... H04W 68/00 |
| 9,949,236 | B2* | 4/2018 | Patil | .................... H04W 68/005 |
| 9,961,668 | B2* | 5/2018 | Patil | ...................... H04W 48/16 |
| 10,009,746 | B2* | 6/2018 | Jung | ..................... H04W 8/005 |
| 10,021,567 | B2* | 7/2018 | Abraham | .......... H04W 72/1205 |
| 10,045,196 | B2* | 8/2018 | Park | ........................ H04L 63/08 |
| 10,064,042 | B2* | 8/2018 | Aoki | ..................... H04W 8/005 |
| 10,075,950 | B2* | 9/2018 | Patil | .................. H04W 72/0446 |
| 10,548,102 | B2* | 1/2020 | Sawada | ................. H04W 48/16 |
| 10,743,307 | B2* | 8/2020 | Patil | .................... H04W 68/005 |
| 2013/0268654 | A1* | 10/2013 | Abraham | ................ H04L 45/26 |
| | | | | 709/224 |
| 2014/0269555 | A1* | 9/2014 | Sadasivam | .............. H04W 4/80 |
| | | | | 370/329 |

(Continued)

FOREIGN PATENT DOCUMENTS

| | | |
|---|---|---|
| JP | 2017060108 A | 3/2017 |
| JP | 2017063312 A | 3/2017 |

*Primary Examiner* — Marceau Milord
(74) *Attorney, Agent, or Firm* — Canon U.S.A., Inc. IP Division

(57) ABSTRACT

A communication apparatus that performs a communication compliant with Wi-Fi NAN standard sets an operation channel of a data communication based on a communication compliant with the Wi-Fi NAN standard which is performed outside a Discovery Window and an operation channel of a data communication based on a communication compliant with a communication standard other than the Wi-Fi NAN standard to be the same.

19 Claims, 11 Drawing Sheets

(56) References Cited

U.S. PATENT DOCUMENTS

| | | | |
|---|---|---|---|
| 2015/0036540 A1* | 2/2015 | Kasslin | H04W 48/16 |
| | | | 370/254 |
| 2015/0081840 A1* | 3/2015 | Patil | H04L 67/32 |
| | | | 709/217 |
| 2016/0127996 A1* | 5/2016 | Patil | H04W 48/16 |
| | | | 370/311 |
| 2016/0353269 A1* | 12/2016 | Kasslin | H04W 48/16 |
| 2017/0086154 A1* | 3/2017 | Sawada | H04W 48/16 |
| 2018/0054492 A1* | 2/2018 | Kim | H04W 48/16 |
| 2018/0077738 A1* | 3/2018 | Kim | H04W 4/80 |
| 2018/0124654 A1* | 5/2018 | Kim | H04W 36/03 |
| 2018/0176856 A1* | 6/2018 | Kim | H04L 61/1541 |
| 2018/0206279 A1* | 7/2018 | Lee | H04W 76/14 |
| 2018/0213387 A1* | 7/2018 | Aoki | H04W 40/00 |

* cited by examiner

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2018/039299, filed Oct. 23, 2018, which claims the benefit of Japanese Patent Application No. 2017-211160, filed Oct. 31, 2017, both of which are hereby incorporated by reference herein in their entirety.

TECHNICAL FIELD

The present invention relates to data communications for communication apparatuses.

BACKGROUND ART

In recent years, a Wi-Fi Neighbor Awareness Network (NAN) standard has been formulated by Wi-Fi Alliance. The Wi-Fi NAN standard is a communication standard for detecting other communication apparatuses, services provided by the other communication apparatus, and the like, in an energy efficient manner. According to the Wi-Fi NAN standard, periods are synchronized with each other in which mutual communication apparatuses (hereinafter, NAN devices) configured to perform a communication compliant with the Wi-Fi NAN standard perform transmission and reception of signals. According to the Wi-Fi NAN standard, the period in which the mutual NAN devices perform the transmission and the reception of the signals is referred to as a Discovery Window (DW), and a set of the NAN devices sharing the DW is referred to as a NAN cluster.

When the NAN device has established a data link with a NAN device participating in the same NAN cluster, since it is possible to perform an application-based data communication, the NAN device can use a service provided by the other NAN device.

PTL 1 describes a NAN data link in which the NAN device uses the service provided by the other NAN device by way of the data communication compliant with the Wi-Fi NAN standard outside the DW.

CITATION LIST

Patent Literature

PTL 1 Japanese Patent Laid-Open No. 2017-63312

A case is supposed where the NAN device has established a communication compliant with the Wi-Fi NAN standard and a communication compliant with a communication standard other than the Wi-Fi NAN standard, and performs data communications in parallel. In a case where an operation channel of the communication compliant with the communication standard other than the Wi-Fi NAN standard is different from an operation channel of the NAN data link-based communication, the NAN device is to switch the operation channels frequently. For this reason, in the NAN device that performs the data communications based on the two communications using the different operation channels, an issue arises that packet loss occurs due to the frequent switching of the operation channels, and throughput is decreased.

SUMMARY OF INVENTION

In view of the above, the present invention aims at suppressing a decrease in throughput in a communication apparatus that performs data communications in both a communication compliant with a Wi-Fi NAN standard and a communication compliant with another communication standard.

A communication apparatus according to the present invention includes a first communication unit configured to operate in a first operation channel in a case where the communication apparatus participates in a NAN cluster compliant with a Wi-Fi Neighbor Awareness Network (NAN) standard, and perform a NAN data link communication compliant with the Wi-Fi NAN standard with a first other communication apparatus outside a Discovery Window (DW), a second communication unit configured to operate in a second operation channel, and perform a data communication compliant with a communication standard other than the Wi-Fi NAN standard with a second other communication apparatus, and a control unit configured to set the first operation channel and the second operation channel to be the same in a case where the communication apparatus performs the NAN data link communication by the first communication unit and the data communication by the second communication unit in parallel.

Further features of the present invention will become apparent from the following description of exemplary embodiments with reference to the attached drawings.

DESCRIPTION OF EMBODIMENTS

Hereinafter, embodiments will be described in detail with reference to the accompanying drawings. It is noted that configurations illustrated according to the following embodiments are merely examples, and the present invention is not limited to the following configurations.

First Embodiment

Figure 1:
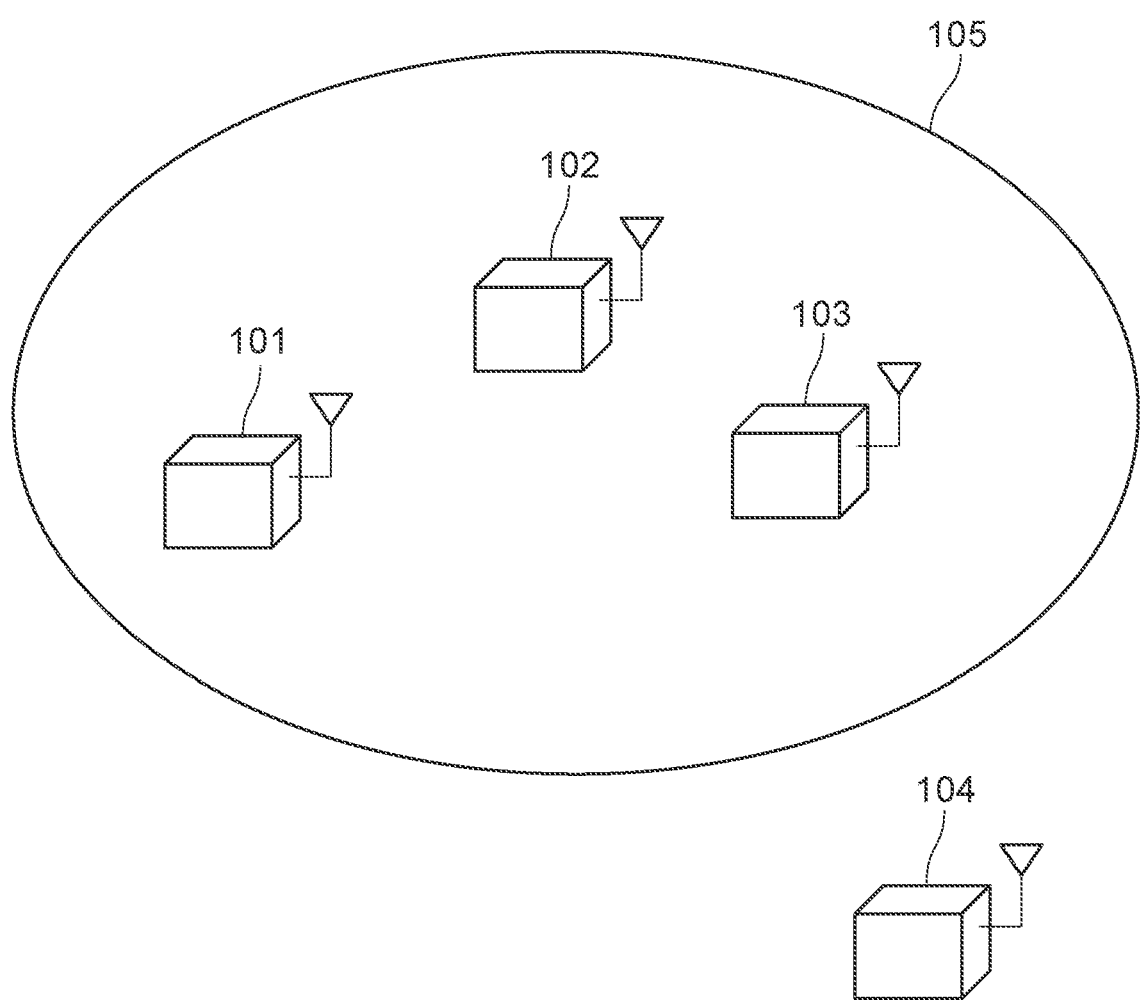
FIG. 1 illustrates a network configuration of a network in which NAN devices participate.

FIG. 1 illustrates a network configuration in which a neighbor awareness network (NAN) device 101 according to the present embodiment participates.

According to the present embodiment, NAN devices 101, 102, and 103 perform wireless communications based on a wireless communication method compliant with a Wi-Fi NAN standard. Each of the NAN devices performs a communication based on a wireless communication method compliant with a different IEEE802.11 series standard other than the Wi-Fi NAN standard in addition to the wireless communication compliant with the Wi-Fi NAN standard. IEEE is an abbreviation of Institute of Electrical and Electronics Engineers, Inc. Specifically, wireless communications via an access point (AP) 104 and an Infrastructure network (hereinafter, referred to as an infrastructure network) which will be described below are performed. As an alternative configuration, a communication compliant with a Wi-Fi Direct standard or a communication compliant with a Wi-Fi IBSS standard may also be performed. It is noted that IBSS is an abbreviation of an independent basic service set. The NAN device may also use a communication compliant with another wireless communication method such as Bluetooth (registered trademark), UWB, or Zigbee in addition to the communication based on the Wi-Fi NAN standard or a communication based on a wireless communication method compliant with another IEEE802.11 series standard. It is noted that UWB is an abbreviation of an ultra-wide band. The UWB includes wireless USB, wireless 1394, WiNet, or the like. The NAN device may also use a communication compliant with a wired communication method such as Ethernet in addition to the communication based on the Wi-Fi NAN standard or the communication based on the wireless communication method compliant with the other IEEE802.11 series standard.

The NAN device 103 is a printing apparatus that provides a printing service of an image or a document. Specifically, the printing apparatus is a printer, a multi-function peripheral (MFP), or the like. The NAN device 103 may also be a providing apparatus that provides other services such as a screen sharing service in addition to, or instead of, the printing service. Other specific examples of the NAN device 103 include a tablet, a display, a projector, and the like, but are not limited to these.

The NAN device 101 is a portable terminal that searches for an apparatus that provides the printing service. It is noted that the NAN device 101 may be a communication apparatus that searches for services provided by other apparatuses such as a smart phone, a tablet, and a personal computer (PC). Specific examples of the NAN device 101 include communication apparatuses such as a smart phone, a tablet, a PC, and a head-mounted display, but are not limited to these. The NAN device 102 is any communication apparatus.

According to the present embodiment, the NAN devices 101, 102, and 103 participate in a NAN cluster 105.

The NAN devices participating in the same NAN cluster share a period for performing transmission and reception of a NAN Synchronization Beacon compliant with the Wi-Fi NAN standard. The period for performing the transmission and the reception of this signal is referred to as a Discovery Window (DW). The NAN Synchronization Beacon refers to a signal transmitted during the DW, and is a synchronization signal for the respective NAN devices participating in the same NAN cluster to be synchronized with each other. A length of the DW according to the present embodiment is 16 time units (TUs), and an interval between a beginning of one DW and a beginning of a subsequent DW is 512 TUs. 1 TU is 1024 µs. It is noted that the length and interval of the DW are not limited to these.

The mutual NAN devices participating in the NAN cluster 105 perform the wireless communication compliant with the Wi-Fi NAN standard during the DW in 6 ch (2.437 GHz) in a 2.4 GHz frequency band. It is noted that an operation channel of the wireless communication compliant with the Wi-Fi NAN standard during the DW in the NAN cluster 105 is not limited to this. It is noted that the operation channel refers to a radio frequency used when the wireless communication is performed.

Each of the NAN devices participating in the NAN cluster is assigned with a role as a Master or a Non-Master. The NAN device assigned with the role as the Non-Master is put into a Sync state or a Non-Sync state. The NAN device serving as the Master transmits the NAN Synchronization Beacon during the DW, and transmits a NAN Discovery Beacon outside the DW. The NAN device that serves as the Non-Master and is also put into the Sync state transmits the NAN Synchronization Beacon during the DW, but does not transmit the NAN Discovery Beacon. The NAN device that serves as the Non-Master and is also put into the Non-Sync state does not transmit either the NAN Synchronization Beacon or the NAN Discovery Beacon.

The NAN Discovery Beacon is a signal transmitted outside the DW, and is an announcement signal for announcing the presence of the NAN cluster in which its own apparatus participates to the other NAN devices participating in the NAN cluster and NAN devices that do not participate in the NAN cluster.

The role of the NAN device is decided depending on a Master Rank of each NAN device. The Master Rank is decided on the basis of a Master Preference, a Random Factor, and a NAN Interface Address. The Master Preference is a value set for each NAN device. As the Master Preference is higher, the Master Rank becomes higher, and the NAN device becomes more likely to be the Master in the NAN cluster.

Any decision method for the Master Preference may be used. For example, the Master Preference may be set to be high with regard to a NAN device supplied with power from a commercial power supply or a NAN device having a high clock stability. In addition, the Master Preference may be set to be low with regard to a NAN device supposed to be used on the move such as a portable terminal.

The Random Factor is a randomly set value, and any one of integers from 0 to 255 is randomly selected. The NAN Interface Address is a value based on a media access control address (MAC address) of the NAN device.

The Master Rank is decided on the basis of the following Mathematical Expression 1.

$$\text{Master Rank} = \text{Master Preference} * 2^{56} + \text{Random Factor} * 2^{48} + \text{MAC}[5] * 2^{40} + \ldots + \text{MAC}[0] \quad (1)$$

where MAC[0] to MAC[5] in Mathematical Expression 1 are segments obtained by dividing the MAC address (48 bits) of the NAN device into 8 bits each from its beginning.

As the Master Rank decided on the basis of the above-described Mathematical Expression 1 is higher, the NAN device is more likely to serve as the Master in the NAN cluster. The NAN device having the highest Master Rank in the NAN cluster is an Anchor Master.

According to the present embodiment, the NAN device 102 is the Master and also the Anchor Master. The NAN devices 101 and 103 are the Non-Masters and are also in the Non-Sync state.

The NAN device can search for services provided by the other NAN devices in the participating NAN cluster. Specifically, the NAN device transmits a Subscribe message during the DW. The Subscribe message refers to an inquiry signal for inquiring the other NAN devices participating in the same NAN cluster on services that can be provided. When the other NAN device participating in the same NAN cluster receives the Subscribe message, the other NAN device transmits a Publish message during the DW as a response to the Subscribe message. The Publish message is a notification signal for notifying the NAN devices participating in the same NAN cluster of a service that can be provided by its own apparatus. This is referred to as a Solicited type service search.

On the other hand, the NAN device can also autonomously transmit the Publish message without receiving the Subscribe message. This is referred to as an Unsolicited type service search.

In the Solicited type service search, the NAN device that transmits the Subscribe message can specify a desired service and perform the service search. In a case where the specified service can be provided by its own apparatus, the NAN device that has received the Subscribe message transmits the Publish message. It is noted that a configuration may be adopted where the NAN device that transmits the Subscribe message does not specify the desired service or specifies a wildcard when the Subscribe message is to be transmitted. In the aforementioned case, the NAN device that has received the Subscribe message performs notification of all the services that can be provided by its own apparatus using the Publish message. It is noted that the NAN device may also perform notification of only a specific service such as the service corresponding to the application activated in its own apparatus or the service decided on the basis of an instruction from a user.

In the Unsolicited type service search, the NAN device performs notification of all the services that can be provided by its own apparatus using the Publish message. It is noted that the NAN device may also perform notification of only a specific service such as the service corresponding to the application activated in its own apparatus or the service decided on the basis of the instruction from the user.

An apparatus that searches for the predetermined service and transmits the Subscribe message is referred to as a Subscriber, and an apparatus that provides the predetermined service and transmits the Publish message is referred to as a Publisher.

According to the present embodiment, the NAN device 101 is the Subscriber serving as the communication apparatus that searches for an apparatus that provides a printing service, and transmits the Subscribe message in the Solicited type service search. The NAN device 103 is the Publisher serving as the printer that provides the printing service and transmits the Publish message in the Solicited type and Unsolicited type service searches.

In a case where the NAN device performs the service search, a Follow-up message may be transmitted and received, and additional information with regard to the predetermined service may be exchanged. Specifically, in a case where the Subscriber that has received the Publish message desires to obtain additional information with regard to a certain service, a request of the additional information with regard to the desired service is issued by transmitting the Follow-up message to the Publisher. The Publisher that has received the Follow-up message from the Subscriber transmits the Follow-up message including the additional information with regard to the service requested by the Subscriber to the Subscriber. As an alternative configuration, when the Publisher transmits the Publish message, the Follow-up message including the additional information with regard to the service included in the Publish message may be transmitted to the Subscriber.

It is noted that the NAN device may exchange the additional information with regard to the predetermined service using a GAS message instead of, or in addition to, the Follow-up message. GAS is an abbreviation of Generic Advertisement Service. The NAN device exchanges the GAS message with the NAN device that provides the service or uses the service after a NAN data link which will be described below is established, and exchanges the additional information with regard to the predetermined service. Whether the additional information with regard to the predetermined service is exchanged using the Follow-up message or exchanged using the GAS message is decided by the Publisher. As an alternative configuration, the above-described decision may be performed by the Subscriber.

In a case where the NAN device searching for the service has performed the service search in the NAN cluster in which its own apparatus participates, and detected the desired service, it is possible to use the service. Specifically, the NAN device establishes a data link with the NAN device that provides the desired service, and performs the application-based data communication.

When a communication compliant with a communication standard other than the Wi-Fi NAN standard is established with the NAN device that provides the desired service, the NAN device establishes the data link with the NAN device that provides the desired service. Since the NAN device has established the data link with the NAN device that provides the desired service, it is possible to use the desired service. The communication compliant with the communication standard other than the Wi-Fi NAN standard which has been established herein is a communication compliant with a Wi-Fi Direct standard. As an alternative configuration, the communication may be a communication compliant with a Wi-Fi IBSS standard, and may also be a communication via an infrastructure network. In addition to these, the communication may be a communication based on a different wireless communication method compliant with the IEEE802.11 series standard other than the Wi-Fi NAN standard. The NAN device that has established the communication compliant with the communication standard other than the Wi-Fi NAN standard establishes a data link with the NAN device that provides the desired service. When the data link has been established, the NAN device performs the application-based data communication with the NAN device that provides the desired service. As a result, the NAN device can use the desired service. The above-described process where the NAN device establishes the communication compliant with the communication standard other than the Wi-Fi NAN standard with the NAN device that provides the service and uses the service by performing the application-based data communication is referred to as Post NAN.

The NAN device can use the service provided by the NAN device participating in the same NAN cluster using a different method other than the Post NAN. Specifically, first, the NAN device establishes a data link with the other NAN devices participating in the same NAN cluster via a communication compliant with the Wi-Fi NAN standard. When the NAN device performs the application-based data communication via the established data link, it is possible to use the service provided by the other NAN device. In this manner, the data link established by the NAN device with the other NAN device that performs the communication compliant with the Wi-Fi NAN standard is referred to as a NAN data link (NDL).

In a case where the NAN device serving as the Subscriber has detected the desired service on the basis of the Publish message received from the NAN device serving as the Publisher, the data communication request signal is transmitted to the Publisher. It is noted that the Subscriber may transmit the data communication request signal to the Publisher not only in a case where the desired service is detected on the basis of the Publish message, but also on the basis of the Follow-up message received from the Publisher. The data communication request signal is a starting request for the NDL. The Publisher that has received the data communication request signal transmits a data communication response signal to the Subscriber as a response which includes whether or not the NDL can be established. In a case where the NDL can be established, the Subscriber that has received the data communication response signal transmits a data communication confirmation signal to the Publisher, and the Publisher and the Subscriber establish the NDL. The Subscriber that has established the NDL with the Publisher can use the service by performing the application-based data communication. It is noted that the operation channel and the period used when the NDL-based data communication is performed are decided when the NDL is established. The NDL-based data communication is performed outside the DW.

As an alternative configuration, instead of the Subscriber, the Publisher may transmit the data communication request signal. In a case where the Subscribe message for searching for the predetermined service is received from the Subscriber and the predetermined service can be provided by its own apparatus, the Publisher may transmit the data communication request signal to the Subscriber. In this case, the Publisher also transmits the Publish message to the Subscriber. As an alternative configuration, in a case where the Follow-up message is received from the Subscriber, the Publisher may transmit the data communication request signal to the Subscriber. In this case, the Publisher also transmits the Follow-up message as a response to the Subscriber.

In a case where the NAN device has established the NDL with the other NAN device and desires to update the operation channel and the period of the already established NDL, the NDL can be updated by transmitting a schedule update request signal. The NAN device that has received the schedule update request signal transmits a schedule update response signal including whether or not the NDL can be performed in a new operation channel and period. In a case where the NDL can be executed in the new operation channel and period on the basis of the schedule update response signal, the NAN device that has received the schedule update response signal transmits a schedule update confirmation signal. Thereafter, the NAN device executes the NDL-based data communication in the updated operation channel and period. It is noted that also in a case where the NDL has been already established with the other NAN device and an NDL is to be further established with the other NAN device, the new NDL may be established by transmitting the schedule update request signal.

The NAN devices 101, 102, and 103 according to the present embodiment are NAN devices that can perform the NDL-based data communication. A configuration may also be adopted where the NAN devices 101, 102, and 103 according to the present embodiment can perform a data communication based on a communication compliant with the IEEE802.11 series standard other than the Wi-Fi NAN standard in addition to the NDL-based data communication. It is noted that the NDL-based data communication is performed using 6 ch, but the operation channel of the NDL is not limited to this. The operation channel of the NDL may be the same as the operation channel of the wireless communication during the DW or may be a different operation channel. The data communication based on the communication compliant with the IEEE802.11 series standard other than the Wi-Fi NAN standard may be a data communication established by the Post NAN.

The AP 104 is an apparatus that performs a communication by the wireless communication method compliant with the IEEE802.11 series standard and functions as an access point. It is noted that the AP 104 may be an apparatus using a communication compliant with the other wireless communication method such as Bluetooth (registered trademark), UWB, or Zigbee in addition to the wireless communication compliant with the IEEE802.11 series standard. As an alternative configuration, the AP 104 may be an apparatus also using a communication compliant with a wired communication method such as Ethernet.

According to the present embodiment, the NAN device 103 performs the communication via the infrastructure network with the AP 104 as the communication compliant with the communication standard other than the Wi-Fi NAN standard. In this case, the NAN device 103 operates as a station (STA) of the infrastructure network. When the communication via the infrastructure network is performed with the AP 104, the NAN device 103 can establish the data link with the AP 104 and perform the application-based data communication. According to the present embodiment, the NAN device 103 performs a data communication for sharing a file with the AP 104.

It is noted that the NAN device 103 may perform the data communication based on the communication compliant with the IEEE802.11 series standard other than the Wi-Fi NAN standard instead of, or in addition to, the data communication based on the communication via the infrastructure network with the AP 104.

It is noted that the NAN devices 101 and 102 may also perform the communication via the infrastructure network with the AP 104.

Figure 2:
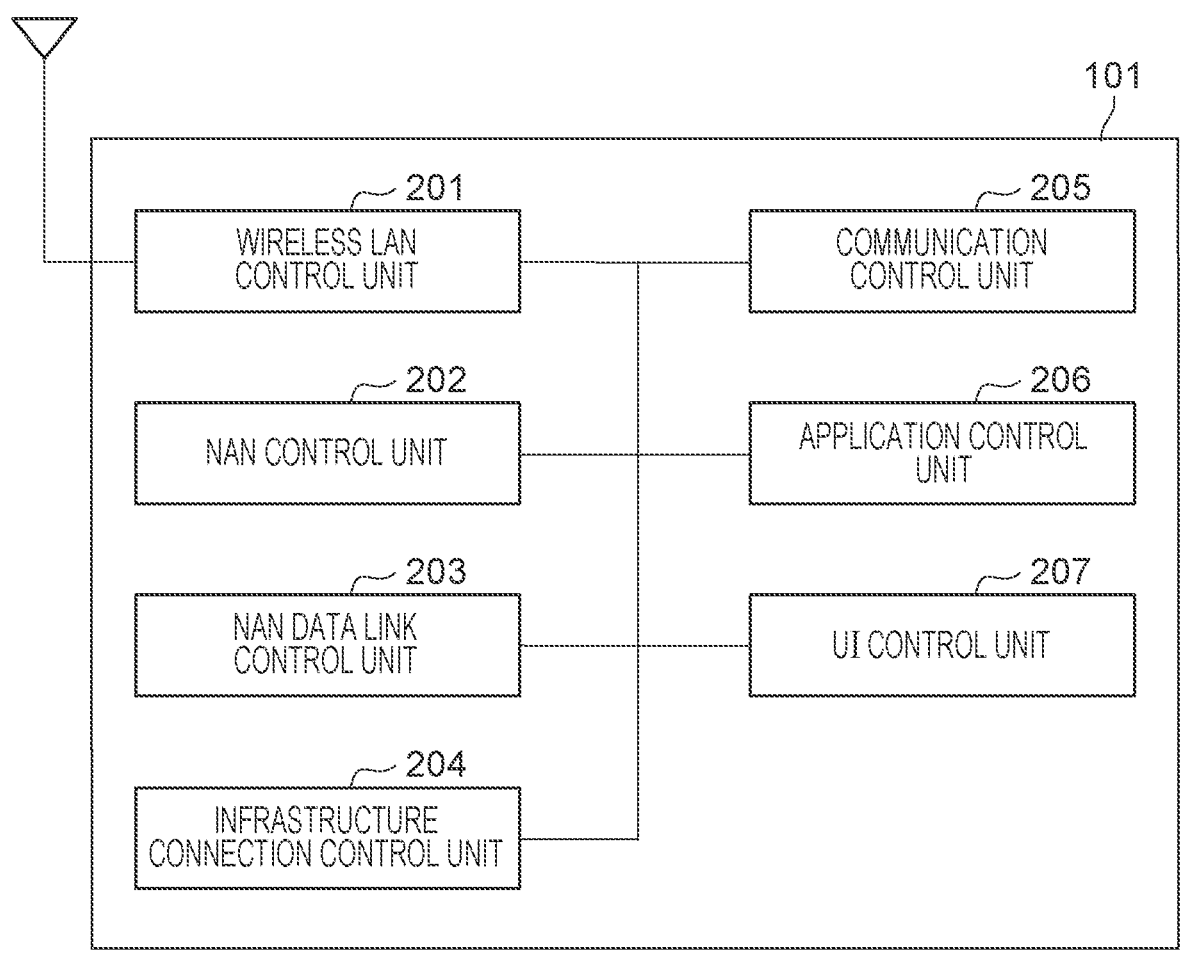
FIG. 2 illustrates a functional configuration of the NAN device.

FIG. 2 illustrates a functional configuration of the NAN device 101. It is noted that functional configurations of the NAN devices 102 and 103 are similar to that of the NAN device 101.

A wireless LAN control unit 201 controls transmission and reception of wireless signals which are performed with the other NAN device or a communication apparatus that can perform a wireless communication. The wireless LAN control unit 201 performs control of the wireless communication based on the wireless communication method compliant with the IEEE802.11 series standard including the Wi-Fi NAN standard.

A NAN control unit 202 performs control compliant with the Wi-Fi NAN standard of the NAN device 101 and control on the start and end of the wireless communication compliant with the Wi-Fi NAN standard. The NAN control unit 202 also performs control of the service search. The NAN control unit 202 controls the wireless LAN control unit 201 when the Post NAN or the NDL is established. When the NAN control unit 202 disables the wireless communication by the wireless LAN control unit 201 for a predetermined period, power consumed by a communication unit 306 which will be described below is reduced, and energy efficiency is increased. It is noted that the predetermined period refers to a period from the end of one DW to the start of the subsequent DW. It is noted that in a case where the NAN Discovery Beacon is transmitted outside the DW or a case where the NDL-based data communication or the like is performed, the wireless communication may be enabled while the signal is transmitted or the data communication is performed.

A NAN data link control unit 203 controls the NAN control unit 202 to establish the NDL with the other NAN device, and performs control for performing the application-based data communication. When the NDL is established by the processing by the NAN data link control unit 203, the NAN device 101 can perform the application-based data communication. According to the present embodiment, in a case where the NDL is established, the NAN device 101 can perform an IPv6-based data communication. It is noted that IPv6 is an abbreviation of Internet Protocol Version 6. The NAN data link control unit 203 also decides the operation channel and the period used when the NDL-based data communication is performed.

An infrastructure connection control unit 204 performs control for performing the communication via the infrastructure network by controlling the wireless LAN control unit 201. The NAN device 101 can establish the data link with the other NAN device or the other apparatus by establishing the communication by the NAN data link control unit 203 or the infrastructure connection control unit 204, and perform the application-based data communication. According to the present embodiment, after the data link has been established with the other NAN device or the other apparatus, it becomes possible for the NAN device 101 to perform the IPv6-based communication.

It is noted that the NAN device 101 may also include a control unit configured to perform another wireless communication compliant with the IEEE802.11 series standard in addition to, or instead of, the infrastructure connection control unit 204. For example, the NAN device 101 may also include a control unit configured to perform a wireless communication compliant with a Wi-Fi Direct standard and a wireless communication compliant with a Wi-Fi IBSS standard. In addition to the control unit configured to perform these wireless communications, the NAN device 101 may also include a control unit configured to perform a communication compliant with the other wireless communication method, such as Bluetooth (registered trademark), UWB, or Zigbee.

A communication control unit 205 controls the application-based data communication using a data link established by the NAN data link control unit 203 or the infrastructure connection control unit 204. According to the present embodiment, the NAN device 101 can perform IPv6 packet transmission and reception (that is, the application-based data communication) by the control of the communication control unit 205. The communication control unit 205 also performs scheduling of the data communication using the data link established by the NAN data link control unit 203 and the infrastructure connection control unit 204. The NAN device 101 performs the data communication using the data links respectively established by the NAN data link control unit 203 and the infrastructure connection control unit 204 at timings scheduled by the communication control unit 205.

An application control unit 206 performs control for executing a service detected by the service search. For example, in a case where the NAN device 101 has detected the printing service, the application control unit 206 performs control for executing application to request for a print job. As an alternative configuration, in a case where the NAN device 101 has detected a photo sharing service, the application control unit 206 performs control for executing application to share photo data. The NAN device 101 may be an apparatus that searches for a plurality of services, and may also include a plurality of the application control units 206.

A UI control unit 207 manages an operation performed by the user of the NAN device 101 with respect to an input unit 304 which will be described below, and transfers a necessary signal to any one of the other control units 201 to 206.

Figure 3:
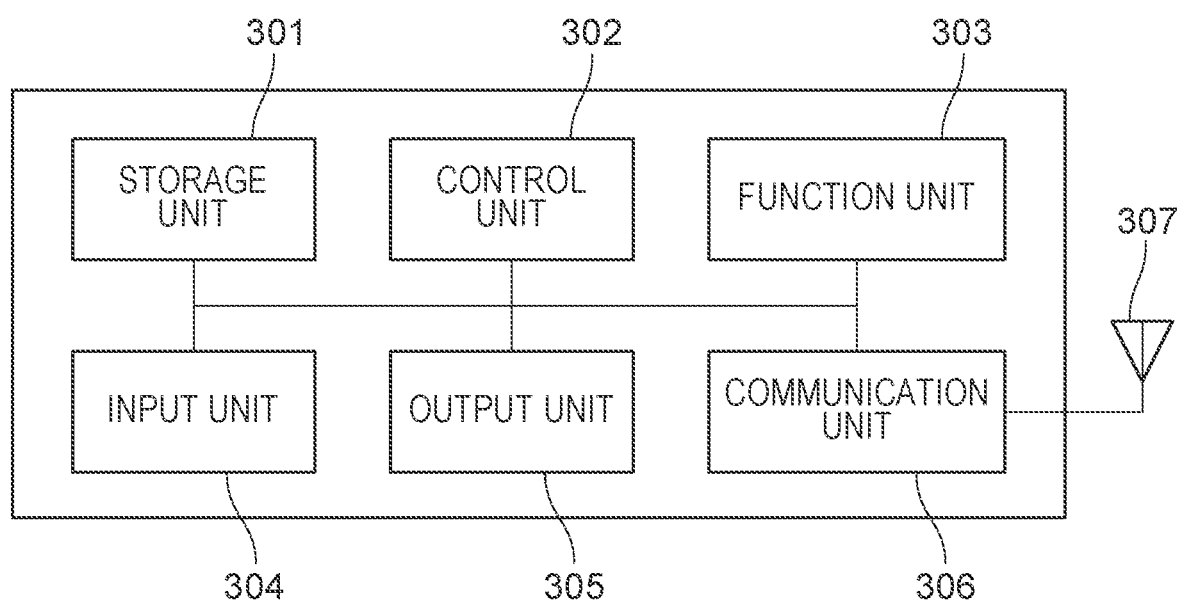
FIG. 3 illustrates a hardware configuration of the NAN device.

FIG. 3 illustrates a hardware configuration of the NAN device 101. It is noted that hardware configurations of the NAN devices 102 and 103 are similar to the NAN device 101.

A storage unit 301 is constituted by one or more memories such as ROMs or RAMs, and stores computer programs for performing various operations which will be described below and various information such as communication parameters for the wireless communication. ROM is an abbreviation of a read only memory, and RAM is an abbreviation of a random access memory. It is noted that a storage medium such as a flexible disc, a hard disc, an optical disc, an opto-magnetic disc, a CD-ROM, a CD-R, a magnetic tape, a non-volatile memory card, or a DVD may be used as the storage unit 301 in addition to the memory such as the ROM and the RAM. The storage unit 301 may also include a plurality of memories and the like.

A control unit 302 is constituted by one or more processors such as CPUs or MPUs, and controls the entirety of the NAN device 101 by executing the computer program stored in the storage unit 301. CPU is an abbreviation of a central processing unit, and MPU is an abbreviation of a micro processing unit. The CPU and the MPU function as computers. It is noted that the control unit 302 may also control the entirety of the NAN device 101 in cooperation with the program stored in the storage unit 301 and an operating system (OS). The control unit 302 may include a plurality of processors such as multi-core processors, and the plurality of processors may control the entirety of the NAN device 101.

The control unit 302 also controls a function unit 303 to execute predetermined processing such as imaging and browsing of contents. The function unit 303 is hardware configured to cause the NAN device 101 to execute the predetermined processing. For example, in a case where the NAN device 101 is a camera, the function unit 303 serves as an imaging unit, and performs imaging processing. As an alternative configuration, in a case where the NAN device 101 is a printing apparatus, the function unit 303 serves as a printing unit, and performs printing processing. For example, in a case where the NAN device 101 is a projector, the function unit 303 serves as a projection unit, and performs projecting processing. Data processed by the function unit 303 may be data stored in the storage unit 301, or may also be data received from the other NAN device via the communication unit 306 which will be described below.

The input unit 304 accepts various operations from the user. An output unit 305 performs various outputs to the user via a monitor screen, a speaker, or the like. Herein, the outputs by the output unit 305 may be audio output by the speaker, vibration output, and the like in addition to display on the screen. It is noted that the input unit 304 and an output destination of the output unit 305 may be realized by a single module using a touch panel. The input unit 304 and the output unit 305 may be integrated with the NAN device 101, or may also be separate bodies. It is noted that a configuration may also be adopted where the NAN device 101 does not include the input unit 304 or the output unit 305.

The communication unit 306 performs control of the wireless communication compliant with the IEEE802.11 series standard including the Wi-Fi NAN standard and control of an Internet Protocol (IP) communication. The communication unit 306 also controls an antenna 307 to perform transmission and reception of wireless signals for a wireless communication. The NAN device 101 performs the application-based data communication with the other NAN device via the communication unit 306. The communication unit 306 includes a transmission function for transmitting data, and a reception function for receiving data. Each of the functions can be switched to be enabled or disabled in accordance with an instruction of the control unit 302. The following operations can be realized. That is, the communication unit 306 consumes power when both the transmission function and the reception function are enabled. When the transmission function and the reception function are disabled, the communication unit 306 does not consume power or operates at lower power consumption as compared with the case where both the transmission function and the reception function are enabled.

Figure 4:
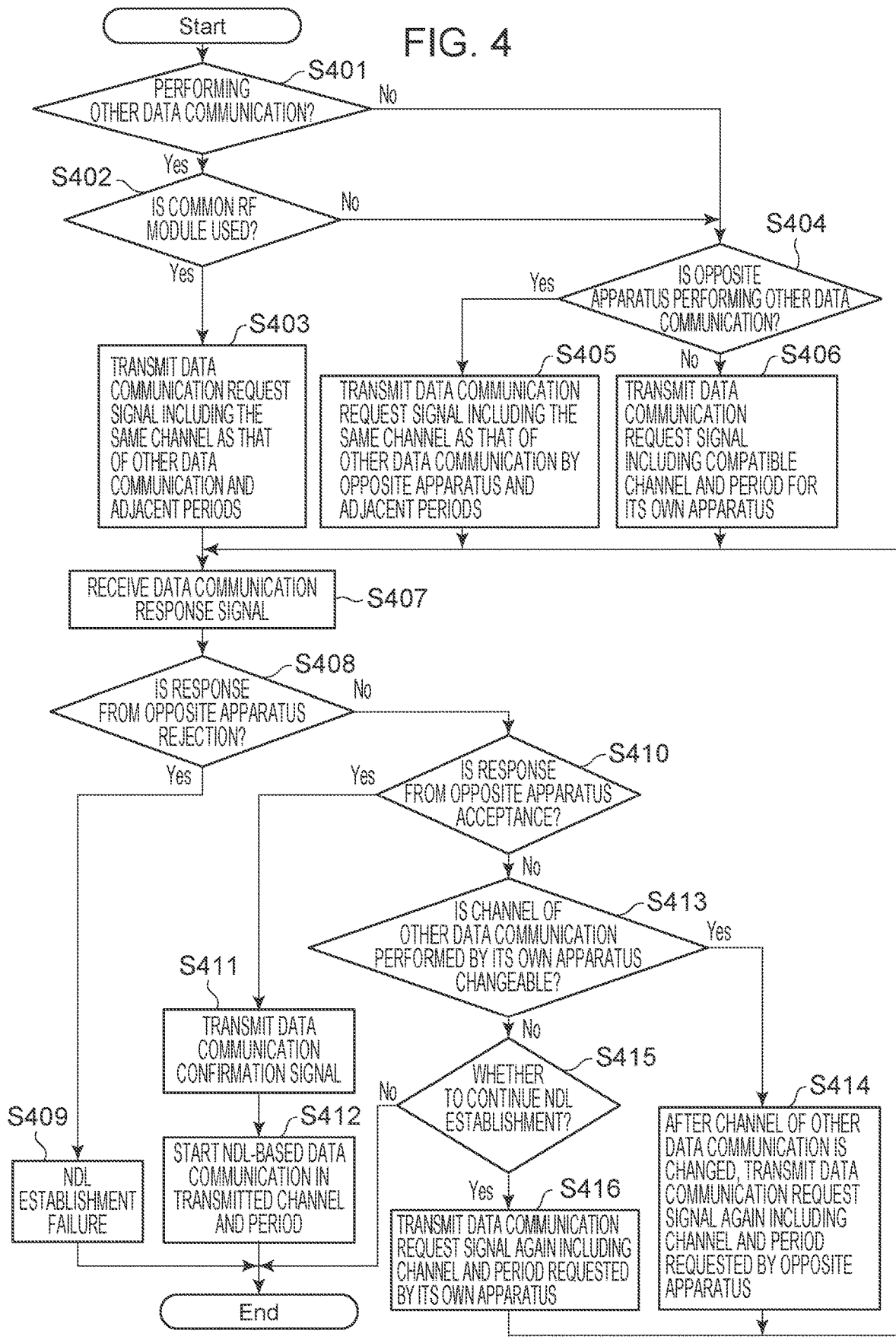
FIG. 4 is a flowchart illustrating processing executed when the NAN device transmits a data communication request signal to establish a NAN data link.

FIG. 4 is a flowchart illustrating processing realized since the program stored in the storage unit 301 is executed by the control unit 302 when the NAN device 101 transmits the data communication request signal to establish the NAN data link.

This flowchart is a flowchart started in a case where the NAN device 101 serving as the Subscriber detects the desired service and establishes the NDL. Specifically, in a case where the Publish message received from the Publisher includes the desired service, the NAN device 101 starts this flowchart. As an alternative configuration, the NAN device 101 may start this flowchart on the basis of the addition information included in the Follow-up message received from the Publisher. Alternatively, the NAN device 101 may also start this flowchart on the basis of a user operation.

First, the control unit 302 of the NAN device 101 determines whether or not the data communication based on the communication compliant with the communication standard other than the Wi-Fi NAN standard is performed by its own apparatus (step S401). Herein, for example, it is determined whether or not the data communication based on the communication compliant with the IEEE802.11 series standard other than the Wi-Fi NAN standard is performed. The communication compliant with the IEEE802.11 series standard other than the Wi-Fi NAN standard refers to, for example, the communication via the infrastructure network, the communication compliant with the Wi-Fi Direct standard, the communication compliant with the Wi-Fi IBSS standard, or the like. It is noted that the communication compliant with the communication standard other than the Wi-Fi NAN standard may also be the communication established by the Post NAN.

In a case where it is determined that the data communication based on the communication compliant with the communication standard other than the Wi-Fi NAN standard is not performed by the NAN device 101 (step S401: No), the control unit 302 of the NAN device 101 performs processing in step S404. On the other hand, in a case where it is determined that the data communication based on the communication compliant with the communication standard other than the Wi-Fi NAN standard is performed by the NAN device 101 (step S401: Yes), the control unit 302 of the NAN device 101 performs processing in step S402.

In step S402, the control unit 302 of the NAN device 101 determines whether or not a common RF module is used in the communication compliant with the Wi-Fi NAN standard and the communication compliant with the communication standard other than the Wi-Fi NAN standard (step S402). The RF module refers to a radio frequency module. According to the present embodiment, the control unit 302 of the NAN device 101 performs the determination on the basis of whether or not the operation channel is switched in a time division manner when the communication compliant with the Wi-Fi NAN standard and the communication compliant with the communication standard other than the Wi-Fi NAN standard are performed.

The control unit 302 of the NAN device 101 performs the determination in step S402 on the basis of information with regard to the RF module of the NAN device 101 which is set in the NAN device 101 at the time of factory shipment. The information with regard to the RF module of the NAN device 101 refers to information indicating whether or not the RF module built in the NAN device 101 switches the operation channel in a time division manner in a case where the NAN device 101 performs a plurality of communications compliant with different communication standards in parallel. In a case where the RF module built in the NAN device 101 switches the operation channel in a time division manner, the control unit 302 of the NAN device 101 determines that the common RF module is used (step S402: Yes). On the other hand, in a case where the RF module built in the NAN device 101 does not switch the operation channel in a time division manner, the control unit 302 of the NAN device 101 determines that the common RF module is not used (step S402: No).

It is noted that the NAN device 101 may skip step S402 in a case where the information with regard to the RF module has been set at the time of factory shipment. Specifically, the NAN device including the built-in RF module commonly used in the communication compliant with the Wi-Fi NAN standard and the communication compliant with the communication standard other than the Wi-Fi NAN standard may skip step S402. In this case, when Yes is determined in step S401, the NAN device 101 performs processing in step S403. On the other hand, the NAN device including different built-in RF modules respectively used in the communication compliant with the Wi-Fi NAN standard and the communication compliant with the communication standard other than the Wi-Fi NAN standard performs the processing in step S401 when this flowchart is started. In this case, in step S401, the NAN device checks whether or not a communication compliant with a communication standard other than the Wi-Fi NAN standard is performed by its own apparatus. Irrespective of whether the communication compliant with the communication standard other than the Wi-Fi NAN standard is performed or not, the NAN device performs the processing in step S404.

As an alternative configuration, in the determination in step S402, the control unit 302 of the NAN device 101 may obtain identification information of the RF module built in its own apparatus, and perform the determination on the basis of the identification information. Specifically, the NAN device 101 holds a list indicating whether or not the RF module having certain identification information is commonly used in the communication compliant with the Wi-Fi NAN standard and the communication compliant with the communication standard other than the Wi-Fi NAN standard. When the identification information of the RF module built in its own apparatus is obtained, the NAN device 101 refers to the list, and performs the determination in step S402. It is noted that the NAN device 101 may hold the list or may also use a list available on an external network. The identification information of the RF module may be information for uniquely identifying an individual RF module, or may also be information for identifying a model of a product such as a model number.

When it is determined that the common RF module is not used in the communication compliant with the Wi-Fi NAN standard and the communication compliant with the communication standard other than the Wi-Fi NAN standard (step S402: No), the control unit 302 of the NAN device 101 performs the processing in step S404. On the other hand, when it is determined that the common RF module is used in the communication compliant with the Wi-Fi NAN standard and the communication compliant with the communication standard other than the Wi-Fi NAN standard (step S402: Yes), the NAN device 101 performs the processing in step S403.

In step S403, the control unit 302 of the NAN device 101 transmits the data communication request signal to the Publisher. The data communication request signal includes the same operation channel as the operation channel of the communication compliant with the communication standard other than the Wi-Fi NAN standard which is performed by the NAN device 101 and periods before and after a period for performing the communication. Since the opposite apparatus that establishes the NDL is the Publisher, and is the NAN device 103 according to the present embodiment, the NAN device 101 transmits the data communication request signal to the NAN device 103. It is noted that the period included in the data communication request signal refers to periods before and after the period in which the data communication based on the communication compliant with the communication standard other than the Wi-Fi NAN standard is performed, and is also a period outside the DW of the NAN cluster 105 in which the NAN device 101 participates. The period in which the data communication based on the communication compliant with the communication standard other than the Wi-Fi NAN standard is performed refers to a period in which the NAN device 101 is to perform a data communication in the communication compliant with the communication standard other than the Wi-Fi NAN standard. For example, in a case where the communication compliant with the communication standard other than the Wi-Fi NAN standard is the communication via the infrastructure network, the NAN device 101 is to receive the Beacons periodically transmitted from the AP. In this case, the period in which the Beacons are transmitted and received becomes the period in which the data communication based on the communication compliant with the communication standard other than the Wi-Fi NAN standard is performed. The NAN device 101 requests the Publisher to establish the NDL in the same operation channel as the operation channel of the communication compliant with the communication standard other than the Wi-Fi NAN standard which is performed by its own apparatus by transmitting the data communication request signal. The NAN device 101 also requests the Publisher to perform the NDL-based data communication in the periods before and after the period for performing the data communication based on the communication compliant with the communication standard other than the Wi-Fi NAN standard which is performed by its own apparatus.

In a case where the data communication based on the plurality of communications having the different operation channels is performed by using the common RF module, the NAN device 101 switches the operation channel in a time division manner. However, when the NAN device 101 switches the operation channel in a time division manner, packet loss occurs, and throughput is decreased. For this reason, when the NAN device 101 establishes the NDL using the same operation channel as the operation channel of the communication compliant with the communication standard other than the Wi-Fi NAN standard which is performed by its own apparatus, it is possible to suppress the decrease in the throughput.

The NAN device 101 also sets periods in which respective communications are performed with regard to the NDL-based data communication and the data communication based on the communication compliant with the communication standard other than the Wi-Fi NAN standard. However, a frame transmitted from the opposite apparatus that has established the NDL is not received at the start or end of these periods in some cases. For this reason, the apparatus that receives the frame is to further take redundant periods before and after the period presented as the communication performing period to be used as waiting periods for frame reception, and the power is therefore redundantly consumed. However, according to the present embodiment, since the same operation channel is used in the NDL and the communication compliant with the communication standard other than the Wi-Fi NAN standard, in a case where the periods in which the two communications are performed continue, even when the communication is switched, the other frame can be received. For this reason, the apparatus that receives the frame does not need to take the redundant periods before and after the period presented as the communication performing period, and the energy efficiency can be accordingly increased.

Figure 7:
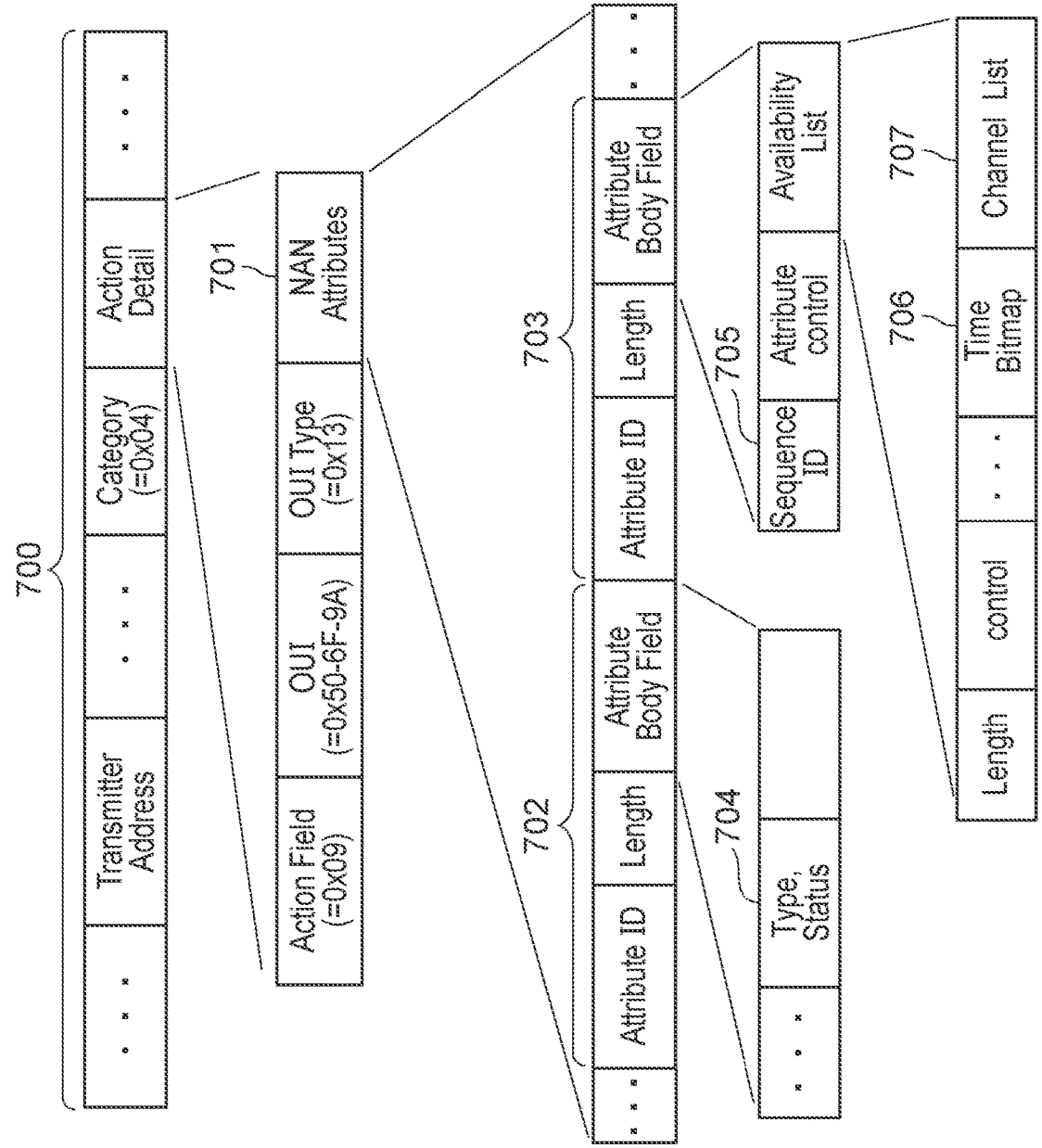
FIG. 7 illustrates a configuration of a frame transmitted and received by the NAN devices in a communication compliant with a Wi-Fi NAN standard.

FIG. 7 illustrates a configuration example of a frame of a data communication request signal transmitted by the NAN device.

A data communication request signal 700 uses a Public Action Frame compliant with the IEEE802.11 series standard. The data communication request signal 700 includes NAN Attributes 701. According to the present embodiment, the NAN Attributes 701 include a plurality of Attributes (attribute information). One of the Attributes included in the NAN Attributes 701 is an Attribute 702 indicating the data communication request signal. Type, Status 704 included in the Attribute 702 includes information indicating that the data communication request signal 700 is a frame playing which role among the frames of the communication compliant with the Wi-Fi NAN standard. According to the present embodiment, the data communication request signal is indicated when a value of upper 4 bits of the Type, Status 704 is 0. The data communication response signal is indicated when the value is 1. The data communication confirmation signal is indicated when the value is 2. Security M4 is indicated when the value is 3. End is indicated when the value is 4. The Security M4 is a signal used for establishing security of the NDL. Lower 4 bits of the Type, Status 704 indicate a type of a response with respect to the transmitted request. According to the present embodiment, continuation is indicated in the case of 0. Acceptance is indicated in the case of 1. Rejection is indicated in the case of 2. When the frame is transmitted as the data communication request signal, 0 is set in the upper 4 bits of the Type, Status 704, and 0 is also set in the lower 4 bits. It is noted that correspondence between these values and information indicated by the values is not limited to this.

The other one of the Attributes included in the NAN Attributes 701 is an Attribute 703 indicating the requested channel and period. In the Attribute 703, information with regard to the period requested by the NAN device 101 is included in a Time Bitmap 706. The information with regard to the operation channel requested by the NAN device 101 is included in a Channel List 707. It is noted that the NAN device 101 may also put a plurality of requested periods and the operation channels in the Time Bitmap 706 and the Channel List 707. In a case where a request is issued using a combination of the period and the operation channel, the NAN device 101 may also use the Attribute including the combination of the period and the operation channel.

A Sequence ID 705 is a value incremented by one each time the operation channel or the period for performing the data communication is updated. Thus, the Publisher that receives the data communication request signal 700 can determine which operation channel and period are the latest.

In step S404, the control unit 302 of the NAN device 101 determines whether or not the data communication based on the communication compliant with the communication standard other than the Wi-Fi NAN standard is performed by the opposite apparatus that establishes the NDL (step S404). The control unit 302 of the NAN device 101 performs the determination in step S404 on the basis of the Publish message transmitted from the Publisher.

Figure 8:
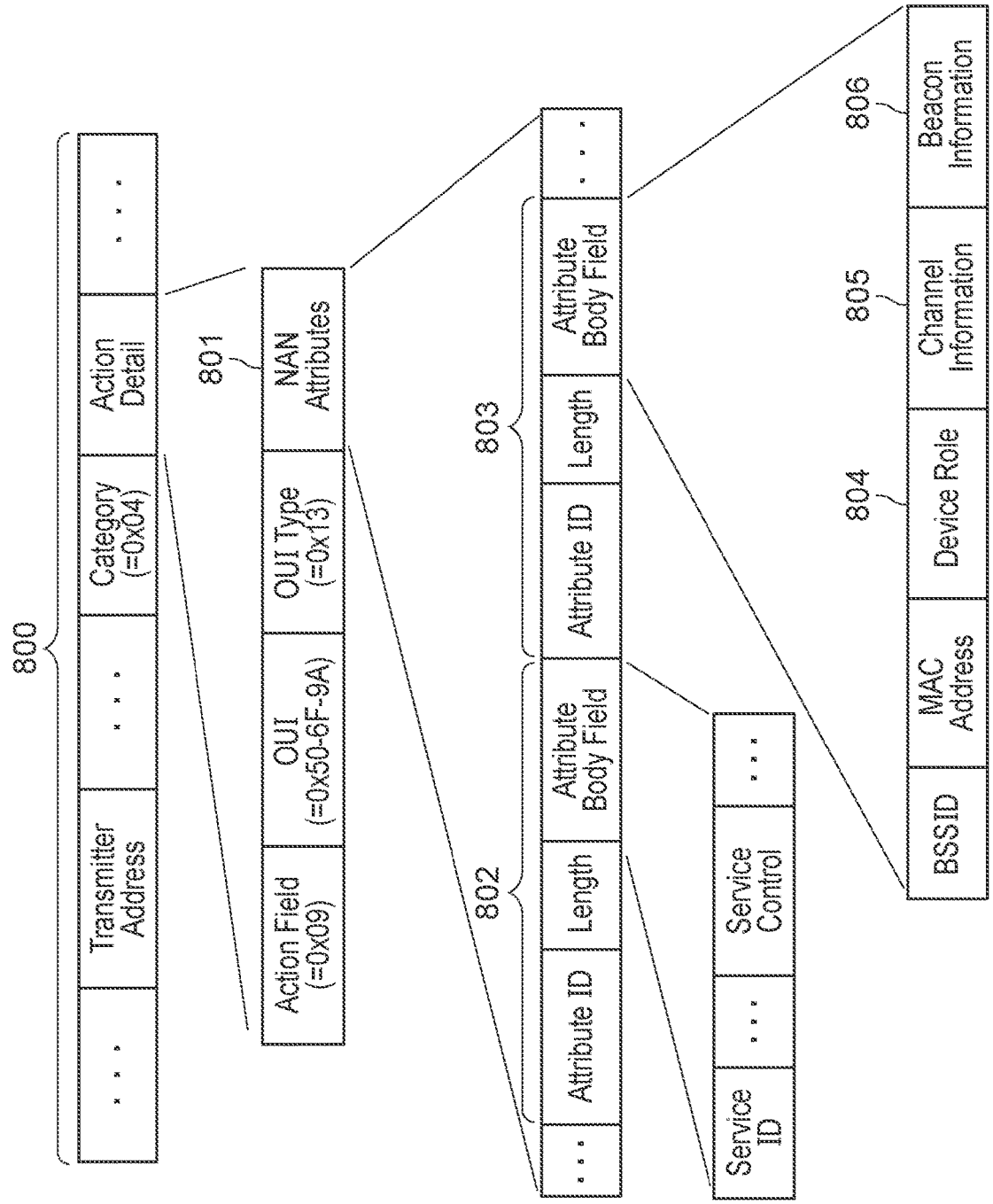
FIG. 8 illustrates a configuration of another frame transmitted and received by the NAN devices in the communication compliant with the Wi-Fi NAN standard.

FIG. 8 illustrates a configuration example of a frame of the Publish message transmitted by the NAN device.

The Publish message 800 of the Wi-Fi NAN standard uses the Public Action Frame of the IEEE802.11 series standard. The Publish message 800 includes NAN Attributes 801. According to the present embodiment, a plurality of Attributes are included in the NAN Attributes 801. One of the Attributes included in the NAN Attributes 801 is a Service Descriptor Attribute 802 indicating a detail of a service notified of by the Publish message. The other one of the Attributes included in the NAN Attributes 801 is an Attribute indicating that the data communication based on the communication compliant with the communication standard other than the Wi-Fi NAN standard is performed. Herein, in one example, a WLAN Infrastructure Attribute indicating that the data communication based on the communication via the infrastructure network is performed is included. It is noted that the Attribute is an extension WLAN Infrastructure Attribute 803 obtained by extending the WLAN Infrastructure Attribute. This is an Attribute represented by integrating existing Attributes with one another. Specifically, a NAN Connection Capability Attribute, a WLAN Infrastructure Attribute, and a Further Availability Map Attribute are exemplified.

When a Device Role 804 indicates 0, it is indicated that the Publisher is currently operating as the AP. When the Device Role 804 indicates 1, it is indicated that the Publisher is the STA already connected to the AP. When the Device Role 804 indicates 2, it is indicated that the Publisher can operate as the STA but is not connected to any AP. When this frame is received, the NAN device 101 can understand which type of communication the Publisher is currently performing.

Channel Information 805 includes information with regard to the operation channel in the communication via the infrastructure network of the Publisher. Beacon Information 806 includes information with regard to a timing when announcement of the network in the communication via the infrastructure network is performed and a period for performing the data communication in the communication via the infrastructure network.

It is noted that, in addition to the above, the Attribute related to the communication compliant with the communication standard other than the Wi-Fi NAN standard may also be a P2P Operation Attribute corresponding to an Attribute with regard to the communication compliant with the Wi-Fi Direct standard. An extended P2P Operation Attribute obtained by extending the Attribute or an extended IBSS Attribute corresponding to an Attribute with regard to the communication compliant with the Wi-Fi IBSS standard may also be used. Alternatively, the existing Attributes may also be combined to be used. For example, a Connection Capability Attribute, the WLAN Infrastructure Attribute, and a Further Availability Attribute may be all included to be transmitted.

It is noted that the method as illustrated in FIG. 8 is an example of a method for informing the NAN device 101 of a state of the Publisher.

It is noted that the information included in the Publish message in FIG. 8 may be included in the Follow-up message transmitted from the Publisher. In the aforementioned case, the determination in step S404 may be performed on the basis of the Follow-up message. As an alternative configuration, the information may be included in the NAN Synchronization Beacon or the NAN Discovery Beacon transmitted by the Publisher. Alternatively, the Subscriber may transmit an inquiry signal to the Publisher serving as the opposite apparatus that establishes the NDL for inquiring whether or not the Publisher is performing the data communication based on the communication compliant with the communication standard other than the Wi-Fi NAN standard. When the Publisher receives the inquiry signal, the Publisher may transmit a response signal including the information included in the Publish message in FIG. 8. In this case, the determination in step S404 may be performed on the basis of the response signal.

When the Publisher determines that the data communication based on the communication compliant with the communication standard other than the Wi-Fi NAN standard is performed (step S404: Yes), the control unit 302 of the NAN device 101 performs processing in step S405. In step S405, the control unit 302 of the NAN device 101 requests the same operation channel as the operation channel used in the communication compliant with the communication standard other than the Wi-Fi NAN standard which is performed by the Publisher as the operation channel used in the NDL. The control unit 302 of the NAN device 101 also requests periods before and after the data communication based on the communication compliant with the communication standard other than the Wi-Fi NAN standard which is performed by the Publisher as periods used in the NDL. Specifically, the control unit 302 of the NAN device 101 transmits the data communication request signal including information with regard to the requested operation channel and period to the Publisher. The control unit 302 of the NAN device 101 that has performed the processing in step S405 performs processing in step S407.

When it is determined that the Publisher is not performing the data communication based on the communication compliant with the communication standard other than the Wi-Fi NAN standard (step S404: No), the control unit 302 of the NAN device 101 performs processing in step S406. In step S406, the control unit 302 of the NAN device 101 transmits the data communication request signal including information with regard to all the operation channels and all the periods in which its own apparatus can perform the NDL-based data communication to the Publisher. It is noted that a case is supposed where No is determined in step S401, and the NAN device 101 uses the common RF module in the communication compliant with the Wi-Fi NAN standard and the communication compliant with the communication standard other than the Wi-Fi NAN standard. In this case, the control unit 302 of the NAN device 101 may include the same operation channel as the operation channel used in the connection to the AP in the past connection in the data communication request signal in step S406. The control unit 302 of the NAN device 101 that has performed the processing in step S406 performs the processing in step S407.

It is noted that when No is determined in step S402 and the data communication request signal is transmitted in step S405, the control unit 302 of the NAN device 101 may take into account the data communication based on the communication compliant with the communication standard other than the Wi-Fi NAN standard which is performed by its own apparatus. It is noted that when No is determined in step S402 and the data communication request signal is transmitted in step S406, the control unit 302 of the NAN device 101 may also take into account the above-described data communication. Specifically, the control unit 302 of the NAN device 101 may also request the Publisher for the operation channel that does not interfere with the operation channel used in the communication compliant with the communication standard other than the Wi-Fi NAN standard which is performed by its own apparatus in these steps. The control unit 302 of the NAN device 101 may also request a different period from the data communication based on the communication compliant with the communication standard other than the Wi-Fi NAN standard which is performed by its own apparatus as a period for performing the NDL. In a case where the NAN device 101 includes different RF modules in the communication compliant with the Wi-Fi NAN standard and the communication compliant with the communication standard other than the Wi-Fi NAN standard, it is possible to suppress the decrease in the throughput by causing the operation channels of the two communications to differ from each other.

It is noted that the control unit 302 of the NAN device 101 may skip step S404 in a case where No is determined in step S401 or a case where No is determined in step S402, and perform the processing in step S406.

In a case where No is determined in step S402, the control unit 302 of the NAN device 101 may transmit the data communication request signal to the Publisher. The data communication request signal transmitted by the NAN device 101 includes the operation channel that does not interfere with the operation channel used in the communication compliant with the communication standard other than the Wi-Fi NAN standard which is performed by the NAN device 101. The control unit 302 of the NAN device 101 may transmit the data communication request signal in which the different period from the data communication based on the communication compliant with the communication standard other than the Wi-Fi NAN standard which is performed by its own apparatus is set as the period for performing the NDL-based data communication. In this case, the control unit 302 of the NAN device 101 performs the above-described processing instead of step S404, step S405, and step S406, and proceeds to step S407.

It is noted that in a case where No is determined in step S402, the control unit 302 of the NAN device 101 may transmit the data communication request signal including the operation channel used during the DW in the communication compliant with the Wi-Fi NAN standard and the periods before and after the DW to the Publisher. This is because, since the NAN device 101 includes the RF module dedicated to the communication compliant with the Wi-Fi NAN standard, by matching the operation channels when the communication compliant with the Wi-Fi NAN standard is performed, it is possible to suppress the decrease in the throughput. When the periods for the DW and the data communications are set to be adjacent to each other, the NAN device 101 can reduce the power consumption. The control unit 302 of the NAN device 101 that has transmitted the data communication request signal performs the processing in step S407.

In step S407, the control unit 302 of the NAN device 101 receives the data communication response signal from the Publisher (step S407).

The data communication response signal refers to a frame transmitted by the Publisher that has received the data communication request signal as a response to the request. A configuration of the frame of the data communication response signal is similar to that of FIG. 7, and includes information with regard to the operation channel and the period for performing the NDL-based data communication which are requested by the Publisher. In a case where the frame is transmitted as the data communication response signal, 1 is set in the upper 4 bits of the Type, Status 704. The value set in the lower 4 bits of the Type, Status 704 is decided on the basis of whether or not the Publisher can establish the NDL in the operation channel and the period requested in the data communication request signal.

When the data communication response signal is received, the control unit 302 of the NAN device 101 determines whether or not the response from the Publisher with respect to the data communication request signal is rejection (step S408). Specifically, the control unit 302 of the NAN device 101 checks the value of the Type, Status 704 of the data communication request signal received in step S407. According to the present embodiment, it is determined whether or not the value of the lower 4 bits of the Type, Status 704 is 2.

In a case where the response from the Publisher is rejection (step S408: Yes), since the control unit 302 of the NAN device 101 does not perform the establishment of the NDL (step S409), this flowchart is ended. It is noted that in a case where the control unit 302 of the NAN device 101 does not perform the establishment of the NDL, the user of the NAN device 101 may be notified that the establishment of the NDL is not performed via the output unit 305 of the NAN device 101. Specifically, in a case where the NAN device 101 includes the monitor screen, a notice notifying that the establishment of the NDL is not performed is displayed on the monitor screen. As an alternative configuration, for example, the notification may be performed by audio in a case where the NAN device 101 includes the speaker. For example, in a case where the NAN device 101 includes a lamp, the notification may be performed by causing the lamp to flash, turning on the lump for error notification, or the like.

On the other hand, in a case where the response from the Publisher is not rejection (step S408: No), the control unit 302 of the NAN device 101 determines whether or not the response from the Publisher is acceptance (step S410). Specifically, similarly as in step S408, the control unit 302 of the NAN device 101 checks the value of the Type, Status 704 of the data communication request signal received in step S407. According to the present embodiment, it is determined whether or not the value of the lower 4 bits of the Type, Status 704 is 1.

In a case where it is determined that the response from the Publisher is acceptance (step S410: Yes), the control unit 302 of the NAN device 101 performs processing in step S411. The control unit 302 of the NAN device 101 transmits the data communication confirmation signal including the information with regard to the operation channel and the period used in the NDL to the Publisher (step S411). Specifically, the control unit 302 of the NAN device 101 decides the operation channel and the period used in the NDL on the basis of the Time Bitmap 706 and the Channel List 707 of the data communication response signal received in step S407 to be transmitted to the Publisher. The Time Bitmap 706 of the data communication response signal received in step S407 includes information with regard to the operation channel that can be used in the NDL by the Publisher. The Channel List 707 in the data communication response signal received in step S407 includes information with regard to the period in which the Publisher can perform the NDL-based data communication. The control unit 302 of the NAN device 101 decides an overlapping operation channel and an overlapping period as the operation channel and the period used in the NDL from the operation channel and the period requested by its own apparatus and the operation channel and the period requested by the Publisher.

The control unit 302 of the NAN device 101 starts the NDL-based data communication using the operation channel and the period transmitted in the data communication confirmation signal with the Publisher to which the data communication confirmation signal has been transmitted in step S411 (step S412), and ends this flowchart.

On the other hand, in a case where the response from the Publisher is not acceptance (step S410: No), the control unit 302 of the NAN device 101 performs processing in step S413. It is noted that a case where the response from the Publisher is neither rejection nor acceptance refers to a case where the response from the Publisher is continuation. The case where the response from the Publisher is continuation is a case where the Publisher continuously performs the establishment of the NDL although the NDL-based data communication is not performed in the operation channel and the period requested from the NAN device 101.

The control unit 302 of the NAN device 101 determines whether or not the operation channel of the communication compliant with the communication standard other than the Wi-Fi NAN standard which is performed by its own apparatus can be changed (step S413). For example, in a case where the NAN device 101 is performing the communication via the infrastructure network and the NAN device 101 is operating as the AP, the probability that the NAN device 101 can change the operation channel of the communication via the infrastructure network is high. In this case, the control unit 302 of the NAN device 101 notifies the opposite apparatus (herein, the STA) that is performing the communication via the infrastructure network of the change of the operation channel. The control unit 302 of the NAN device 101 that has notified the STA of the change of the operation channel changes the operation channel of the communication via the infrastructure network. As an alternative configuration, a case is supposed where the NAN device 101 is performing the communication compliant with the Wi-Fi Direct standard. In a case where the NAN device 101 is operating as a Group Owner of the Wi-Fi Direct standard, the probability that the NAN device 101 can change the operation channel of the communication compliant with the Wi-Fi Direct standard is high. In this case, the control unit 302 of the NAN device 101 notifies the opposite apparatus (herein, a Client) that is performing the communication compliant with the Wi-Fi Direct standard of the change of the operation channel. The control unit 302 of the NAN device 101 that has notified the Client of the change of the operation channel changes the operation channel of the communication compliant with the Wi-Fi Direct standard.

In this manner, it is determined that the operation channel of the communication compliant with the communication standard other than the Wi-Fi NAN standard which is performed by the NAN device 101 can be changed (step S413: Yes), the control unit 302 of the NAN device 101 performs processing in step S414. In step S414, the control unit 302 of the NAN device 101 changes the operation channel of the communication compliant with the communication standard other than the Wi-Fi NAN standard, and transmits the data communication request signal again in the operation channel and the period requested by the Publisher. The control unit 302 of the NAN device 101 changes the operation channel of the communication compliant with the communication standard other than the Wi-Fi NAN standard which is performed by the NAN device 101 to be the same operation channel as the operation channel requested by the Publisher. It is noted that when it is determined in step S402 that the different RF modules are used in the communication compliant with the Wi-Fi NAN standard and the communication compliant with the communication standard other than the Wi-Fi NAN standard, the interference of the operation channel may be taken into account in step S414. Specifically, in step S414, the operation channel of the communication compliant with the communication standard other than the Wi-Fi NAN standard may be changed to the operation channel that does not interfere with the operation channel requested by the Publisher. When the processing in step S414 is performed, the control unit 302 of the NAN device 101 performs the processing in step S407.

It is noted that when the operation channel of the communication compliant with the communication standard other than the Wi-Fi NAN standard is changed in step S414, the control unit 302 of the NAN device 101 may also take into account the period requested by the Publisher which is received in step S407. A case is supposed where the period requested by the Publisher interferes with the period for performing the data communication based on the communication compliant with the communication standard other than the Wi-Fi NAN standard which is performed by the NAN device 101. In this case, the control unit 302 of the NAN device 101 may change the period for performing the data communication based on the aforementioned communication together with the operation channel of the communication compliant with the communication standard other than the Wi-Fi NAN standard.

On the other hand, in a case where it is determined that the operation channel of the communication compliant with the communication standard other than the Wi-Fi NAN standard which is performed by the NAN device 101 is not changed (step S413: No), the control unit 302 of the NAN device 101 performs processing in step S415. For example, in a case where the NAN device 101 is performing the communication via the infrastructure network and the NAN device 101 is operating as the STA, the probability that the NAN device 101 is not to change the operation channel of the communication via the infrastructure network is high. As an alternative configuration, a case is supposed where the NAN device 101 is performing the communication compliant with the Wi-Fi Direct standard. In a case where the NAN device 101 is operating as the Client, the probability that the NAN device 101 is not to change the operation channel of the communication compliant with the Wi-Fi Direct standard is high.

The control unit 302 of the NAN device 101 determines whether or not the establishment of the NDL is continued in step S415. The determination is performed on the basis of whether or not the NAN device 101 has attempted the establishment of the NDL the predetermined number of times or more with respect to the same NAN device. In a case where the NAN device 101 has attempted the establishment of the NDL the predetermined number of times or more with respect to the same NAN device, it is determined that the establishment of the NDL is not continued. The predetermined number of times is preset in the NAN device 101. As an alternative configuration, the predetermined number of times may be decided by the user or may also be decided on the basis of the application activated in the NAN device 101. As an alternative configuration, the determination in step S415 may also be performed on the basis of whether or not the NAN device 101 has attempted the establishment of the NDL for a predetermined period of time or longer with respect to the same NAN device. As an alternative configuration, the determination in step S415 may be performed on the basis of an operation by the user of the NAN device 101, or may also be performed on the basis of a type of the service that can be used by the NAN device 101 by establishing the NDL. As an alternative configuration, the determination may be performed on the basis of whether or not another NAN device that can provide the service desired by the NAN device 101 is available. Alternatively, in a case where the flow chart in FIG. 4 is started by the user instruction, the control unit 302 of the NAN device 101 may determine Yes in step S415. In a case where the data communication based on the communication compliant with the communication standard other than the Wi-Fi NAN standard is performed, the control unit 302 of the NAN device 101 may perform the determination on the basis of the communication amount of the data communication. In a case where the communication amount of the data communication is lower than a predetermined value, the control unit 302 of the NAN device 101 may also determine Yes in step S415.

When it is determined that the establishment of the NDL is not continued (step S415: No), the control unit 302 of the NAN device 101 ends this flowchart. On the other hand, when it is determined that the establishment of the NDL is continued (step S415: Yes), the control unit 302 of the NAN device 101 performs processing in step S416.

The control unit 302 of the NAN device 101 transmits the information again with regard to the operation channel and the period requested by the NAN device 101 which is included in the data communication request signal transmitted in any one of in steps S403, S405, and S406 (step S416). When the processing in step S416 is performed, the control unit 302 of the NAN device 101 performs the processing in step S407.

It is noted that when it is determined in step S401 that the data communication based on the communication compliant with the communication standard other than the Wi-Fi NAN standard is not performed, the control unit 302 of the NAN device 101 skips the determination in step S413, and performs the processing in step S415.

In this flowchart, the operation channel and the period included in the data communication request signal are determined in step S413 on the basis of whether or not the operation channel of the communication compliant with the communication standard other than the Wi-Fi NAN standard which is performed by the NAN device 101 can be changed. However, the configuration is not limited to this, and the determination may be performed on the basis of whether or not the establishment of the NDL has been attempted a predetermined number of times. In a case where the NAN device 101 has attempted the establishment of the NDL the predetermined number of times or more, the control unit 302 of the NAN device 101 performs the processing in step S414. As an alternative configuration, in step S413, the control unit 302 of the NAN device 101 may perform the determination on the basis of master ranks of the NAN device 101 and the Publisher. For example, in a case where it is determined in step S413 that the master ranks of the NAN device 101 is lower than the master ranks of the Publisher, the control unit 302 of the NAN device 101 may perform the processing in step S414.

In this flowchart, in a case where No is determined in step S410, that is, a case where the data communication response signal received from the Publisher is continuation, the NAN device 101 may prioritize the establishment of the NDL. Specifically, in a case where No is determined in step S410, the control unit 302 of the NAN device 101 may establish the NDL using the operation channel and the period included in the received data communication response signal.

It is noted that in a case where the NAN device 101 has already established the NDL with the Publisher and has started this flowchart to establish a further new NDL, the NAN device 101 may transmit the schedule update request signal instead of the data communication request signal. In this case, the data communication response signal turns to the schedule update response signal, and the data communication confirmation signal turns to the schedule update confirmation signal. Frame configurations of the schedule update request signal, the schedule update response signal, and the schedule update confirmation signal are as illustrated in FIG. 7. These frames are used in a case where the operation channel and the period of the already established NDL are to be changed or a case where the new NDL is to be established between the NAN devices that have already established the NDL. In this case, the operation channels of the already established NDL and the NDL to be newly established are matched with each other.

It is noted that the NAN device 101 decides the operation channel and the period included in the data communication request signal in this flowchart on the basis of whether or not its own apparatus and the opposite apparatus that establish the NDL are performing the communication compliant with the communication standard other than the Wi-Fi NAN standard or the like. However, the configuration is not limited to this, and the NAN device 101 may also obtain the information on the operation channel and the period in which the Publisher can perform the NDL-based data communication by receiving the data communication response signal from the Publisher in advance. The NAN device 101 that has received the data communication response signal transmits the data communication confirmation signal to the Publisher by taking into account the operation channel and the period in which the NAN device 101 can perform the NDL-based data communication.

Specifically, when the NAN device 101 starts this flowchart, first, the NAN device 101 transmits the data communication request signal including an effect indicating that the NDL-based data communication can be performed in all the operation channels and all the periods to the Publisher. This processing is performed instead of the processing in step S401 to step S406. The data communication request signal transmitted in this processing may be a signal that does not include the requested operation channel and period. The Publisher that has received the data communication request signal transmits the data communication response signal where the operation channel and the period in which its own apparatus can perform the NDL-based data communication are included in the data communication response signal to the NAN device 101. When the data communication response signal is received, the NAN device 101 determines whether or not its own apparatus is performing the data communication based on the communication compliant with the communication standard other than the Wi-Fi NAN standard. The determination is similarly performed as in step S401.

When it is determined that its own apparatus is performing the data communication based on the communication compliant with the communication standard other than the Wi-Fi NAN standard, the NAN device 101 determines whether or not the common RF module is used in the communication and the communication compliant with the Wi-Fi NAN standard. The determination is similarly performed as in step S402.

In a case where the NAN device 101 is using the common RF module, it is determined whether or not the operation channel and the period in which the NAN device 101 can perform the NDL-based data communication are included in the operation channel and the period included in the received data communication response signal. Specifically, the NAN device 101 determines whether or not the operation channel used in the communication compliant with the communication standard other than the Wi-Fi NAN standard is common to the operation channel included in the received data communication response signal. In addition, the NAN device 101 determines whether or not periods before and after the period in which the data communication based on the communication compliant with the communication standard other than the Wi-Fi NAN standard is performed are included in the period included in the received data communication response signal. When it is determined that the operation channel and the period in which the NAN device 101 can perform the NDL-based data communication are included in the data communication response signal, the NAN device 101 transmits the data communication confirmation signal including the operation channel and the period to the Publisher. The NAN device 101 then performs the NDL-based data communication with the Publisher in the operation channel and the period included in the data communication confirmation signal. On the other hand, when it is determined that the operation channel and the period in which the NAN device 101 can perform the NDL-based data communication are not included in the received data communication response signal, the NAN device 101 does not transmit the data communication confirmation signal.

On the other hand, in a case where the NAN device 101 is not performing the data communication based on the communication compliant with the communication standard other than the Wi-Fi NAN standard and a case where it is determined that the NAN device 101 is not using the common RF module, the NAN device 101 performs common processing. In these cases, the NAN device 101 determines whether or not the common operation channel and period exist in the operation channel and the period included in the received data communication response signal and all the operation channels and all the periods in which its own apparatus can perform the NDL-based data communication. In a case where it is determined that the common operation channel and period exist, the NAN device 101 transmits the data communication confirmation signal including the operation channel and the period to the Publisher. In a case where a plurality of common operation channels exist, the NAN device 101 may select one operation channel to be included in the data communication confirmation signal. With regard to the period too, the NAN device 101 may include a part of the common periods, instead of all the common periods, in the data communication confirmation signal. In a case where it is determined that the common operation channel and period do not exist, the NAN device 101 does not transmit the data communication confirmation signal.

It is noted that in a case where the common RF module is not used, the NAN device 101 may determine whether or not the operation channel that does not interfere with the operation channel used in the communication compliant with the communication standard other than the Wi-Fi NAN standard is included in the received data communication response signal. The NAN device 101 similarly performs the determination with regard to the period. In a case where it is determined that the operation channel and the period are included in the data communication response signal, the NAN device 101 transmits the data communication confirmation signal including the operation channel and the period. On the other hand, in a case where it is determined that the operation channel and the period are not included in the data communication response signal, the NAN device 101 does not the data communication confirmation signal.

It is noted that in a case where the NAN device 101 does not transmit the data communication confirmation signal, the NAN device 101 may transmit the data communication request signal including the operation channel and the period in which its own apparatus can perform the NDL-based data communication to the Publisher.

In this flowchart, the Subscriber is set to transmit the data communication request signal. The configuration is not limited to this, and the Publisher may transmit the data communication request signal. In the aforementioned case, this flowchart is started in a case where the Publisher receives the Subscribe message, and transmits the Publish message as a response to the Subscribe message. As an alternative configuration, this flowchart may be started in a case where the Publisher receives the Follow-up message from the Subscriber, and transmits the Follow-up message as a response to the Follow-up message. The Publisher may also start this flowchart on the basis of the user instruction from the user. The Publisher transmits the data communication request signal or the data communication confirmation signal to the Subscriber, and the Subscriber transmits the data communication response signal to the Publisher.

As in this flowchart, by taking into account the data communication based on the communication compliant with the communication standard other than the Wi-Fi NAN standard which is performed by its own apparatus and the opposite apparatus when the NDL is established, it is possible to avoid the interference between the data communication based on the aforementioned communication and the NDL-based data communication. Specifically, when the operation channel and the period for performing the data communication of each of the communication compliant with the communication standard other than the Wi-Fi NAN standard and the NDL are taken into account, it is possible to suppress the decrease in the throughput, and the power consumption can also be reduced.

Figure 5:
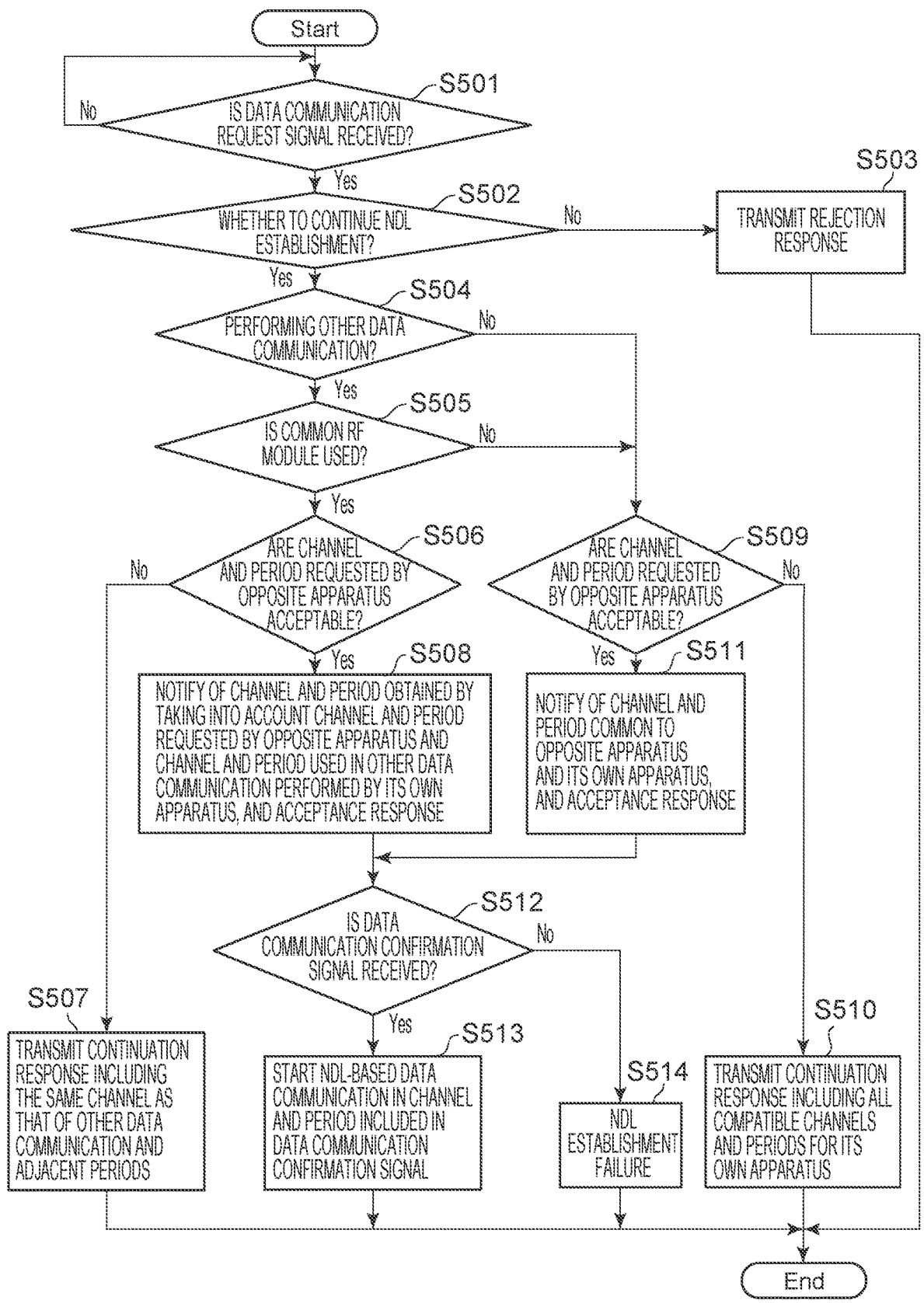
FIG. 5 is a flowchart illustrating processing executed when the NAN device receives the data communication request signal to establish the NAN data link.

FIG. 5 is a flowchart illustrating processing realized since the program stored in the storage unit 301 is executed by the control unit 302 when the NAN device 103 establishes the NAN data link by receiving the data communication request signal.

This flowchart is a flowchart started when the NAN device 103 serving as the Publisher has received the Subscribe message and transmitted the Publish message as a response to the Subscribe message. As an alternative configuration, the flowchart may be started in a case where the Follow-up message is received from the Subscriber, and the Follow-up message is transmitted as a response to the Follow-up message, or the flowchart may also be started on the basis of the user instruction of the NAN device 103.

First, the control unit 302 of the NAN device 103 determines whether or not the data communication request signal transmitted from the NAN device 101 serving as the Subscriber is received (step S501). The data communication request signal includes information with regard to the operation channel of the NDL and the period for performing the NDL-based data communication which are requested by the Subscriber. When it is determined that the data communication request signal is received (step S501: Yes), the control unit 302 of the NAN device 103 performs processing in step S502. On the other hand, when it is determined that the data communication request signal is not received (step S501: No), the control unit 302 of the NAN device 103 performs the processing in step S501.

The control unit 302 of the NAN device 103 determines whether or not the establishment of the NDL is continued (step S502). In the determination, the NAN device 103 performs the determination on the basis of whether or not the establishment of the NDL has been attempted the predetermined number of times or more from the same NAN device. As an alternative configuration, the determination may be performed on the basis of the user instruction of the NAN device 103. Alternatively, the determination may be performed on the basis of whether or not the NAN device 103 is compatible to the operation channel and the period requested by the Subscriber. Alternatively, in a case where the NAN device 103 can establish up to a predetermined number of NDLs, the control unit 302 of the NAN device 103 may perform the determination on the basis of whether or not the NAN device 103 has established the predetermined number of NDLs or more. As an alternative configuration, the control unit 302 of the NAN device 103 may perform the determination on the basis of whether or not the NAN device 103 has established the NDLs with a predetermined number of NAN devices or more.

When it is determined that the establishment of the NDL is not continued (step S502: No), the control unit 302 of the NAN device 103 transmits the data communication response signal including a rejection response to the Subscriber (step S503). Specifically, the control unit 302 of the NAN device 103 performs the transmission by setting 2 indicating rejection in the lower 4 bits of the Type, Status 704 of the data communication response signal. It is noted that the data communication response signal transmitted in this step may or may not include the information with regard to the operation channel and the period in which the NAN device 103 can perform the NDL. When the processing in step S503 is performed, the control unit 302 of the NAN device 103 ends this flowchart.

On the other hand, when it is determined that the establishment of the NDL is continued (step S502: Yes), the control unit 302 of the NAN device 103 performs processing in step S504. The control unit 302 of the NAN device 103 determines whether or not its own apparatus is performing the data communication based on the communication compliant with the communication standard other than the Wi-Fi NAN standard (step S504). In this step, processing similar to step S401 in FIG. 4 is performed. When it is determined that the data communication based on the communication compliant with the communication standard other than the Wi-Fi NAN standard is not performed (step S504: No), the control unit 302 of the NAN device 103 performs processing in step S509.

On the other hand, when it is determined that the data communication based on the communication compliant with the communication standard other than the Wi-Fi NAN standard is performed (step S504: Yes), the control unit 302 of the NAN device 103 performs processing in step S505. The control unit 302 of the NAN device 103 determines whether or not the common RF module is used in the communication compliant with the Wi-Fi NAN standard and the communication compliant with the communication standard other than the Wi-Fi NAN standard (step S505). The determination is similarly performed as in step S402 in FIG. 4. When it is determined that the common RF module is not used in the communication compliant with the Wi-Fi NAN standard and the communication compliant with the communication standard other than the Wi-Fi NAN standard (step S505: No), the control unit 302 of the NAN device 103 performs the processing in step S509.

On the other hand, when it is determined that the common RF module is used (step S505: Yes), the control unit 302 of the NAN device 103 performs processing in step S506. The control unit 302 of the NAN device 103 determines whether or not the operation channel and the period that are requested by the Subscriber and included in the data communication request signal received in step S501 are acceptable. The determination is performed on the basis of whether or not the NAN device 103 is compatible to the operation channel and the period requested by the Subscriber. In a case where the NAN device 103 is compatible to the operation channel and the period requested by the Subscriber, Yes is determined in step S506. On the other hand, the NAN device 103 is not compatible to the operation channel and the period requested by the Subscriber, No is determined in step S506. In addition, the determination is performed on the basis of whether or not the same operation channel as that of the communication compliant with the communication standard other than the Wi-Fi NAN standard which is performed by the NAN device 103 is included in the operation channel requested from the Subscriber. In a case where the same operation channel as that of the communication compliant with the communication standard other than the Wi-Fi NAN standard which is performed by the NAN device 103 is included in the operation channel requested from the Subscriber, Yes is determined in step S506. On the other hand, the same operation channel as that of the communication compliant with the communication standard other than the Wi-Fi NAN standard which is performed by the NAN device 103 is not included in the operation channel requested from the Subscriber, No is determined in step S506. Furthermore, the determination is performed on the basis of whether or not periods before and after the data communication based on the communication compliant with the communication standard other than the Wi-Fi NAN standard which is performed by the NAN device 103 are included in the period requested from the Subscriber. In a case where the periods before and after the data communication based on the communication compliant with the communication standard other than the Wi-Fi NAN standard which is performed by the NAN device 103 are included in the period requested from the Subscriber, Yes is determined in step S506. On the other hand, the periods before and after the data communication based on the communication compliant with the communication standard other than the Wi-Fi NAN standard which is performed by the NAN device 103 are not included in the period requested from the Subscriber, No is determined in step S506.

When it is determined that the operation channel and the period requested by the Subscriber are not acceptable (step S506: No), the control unit 302 of the NAN device 103 transmits the data communication response signal including a continuation response to the Subscriber (step S507). The data communication response signal transmitted by the NAN device 103 in this step includes information with regard to the same operation channel as that of the communication compliant with the communication standard other than the Wi-Fi NAN standard which is performed by the NAN device 103 and the periods before and after the data communication based on the aforementioned communication. When the processing in step S507 is performed, the control unit 302 of the NAN device 103 ends this flowchart.

On the other hand, when it is determined that the operation channel and the period requested by the Subscriber are acceptable (step S506: Yes), the control unit 302 of the NAN device 103 transmits the data communication response signal including an acceptance response (step S508). For the decision on the operation channel and the period included in the data communication response signal, the operation channel and the period requested by the Subscriber and the operation channel of the communication compliant with the communication standard other than the Wi-Fi NAN standard which is performed by its own apparatus and the period for performing the data communication are taken into account. Specifically, the control unit 302 of the NAN device 103 includes the same operation channel as the operation channel of the communication compliant with the communication standard other than the Wi-Fi NAN standard which is performed by its own apparatus among the operation channels requested by the Subscriber in the data communication response signal. The control unit 302 of the NAN device 103 also includes periods equivalent to periods before and after the period for performing the data communication based on the communication compliant with the communication standard other than the Wi-Fi NAN standard which is performed by its own apparatus out of the period requested by the Subscriber in the data communication. After the processing in step S508 is performed, the control unit 302 of the NAN device 103 performs processing in step S512.

In step S509, the control unit 302 of the NAN device 103 determines whether or not the operation channel and the period requested by the Subscriber are acceptable. The determination is performed on the basis of whether or not the NAN device 103 is compatible to the operation channel and the period requested by the Subscriber. In a case where the NAN device 103 is performing the communication compliant with the communication standard other than the Wi-Fi NAN standard, the determination is performed on the basis of whether or not the operation channel that does not interfere with the operation channel of the communication is included in the operation channel requested by the Subscriber. In this case, furthermore, the determination may be performed on the basis of whether or not the periods before and after the period for performing the data communication based on the aforementioned communication are included in the period requested by the Subscriber.

In a case where it is determined that the operation channel and the period requested by the Subscriber are not acceptable (step S509: No), the control unit 302 of the NAN device 103 performs processing in step S510. In step S510, the control unit 302 of the NAN device 103 transmits the data communication response signal including the continuation response to the Subscriber. The data communication response signal transmitted by the NAN device 103 in this step includes the information with regard to all the operation channels and the period in which the NAN device 103 can perform the NDL. It is noted that in a case where the NAN device 103 is performing the data communication based on the communication compliant with the communication standard other than the Wi-Fi NAN standard, the operation channel that does not interfere with the operation channel of the communication and the period that does not interfere with the period of the data communication based on the aforementioned communication are included in the data communication response signal.

In a case where it is determined that the operation channel and the period requested by the Subscriber are acceptable (step S509: Yes), the control unit 302 of the NAN device 103 performs processing in step S511. In step S511, the control unit 302 of the NAN device 103 transmits the data communication response signal including the acceptance response to the Subscriber. The data communication response signal in this step includes the common operation channel and period in the operation channel and the period requested from the Subscriber and the operation channel and the period in which its own apparatus can perform the NDL. It is noted that in a case where the NAN device 103 performs the communication based on the communication standard other than the Wi-Fi NAN standard, the data communication response signal in this step includes the operation channel and the period that do not interfere with the operation channel of the communication and the period of the data communication based on the aforementioned communication. When the processing in step S511 is performed, the control unit 302 of the NAN device 103 performs the processing in step S512.

The control unit 302 of the NAN device 103 determines whether or not the data communication confirmation signal is received from the Subscriber (step S512). This determination is performed on the basis of whether or not the NAN device 103 has received the data communication confirmation signal until a predetermined period elapses since the data communication response signal is transmitted.

When it is determined that the NAN device 103 has received the data communication confirmation signal (step S512: Yes), the control unit 302 of the NAN device 103 performs processing in step S513. The control unit 302 of the NAN device 103 establishes the NDL with the Subscriber in the operation channel and the period included in the received data communication confirmation signal, and starts the data communication (step S513). When the processing in step S513 is performed, the control unit 302 of the NAN device 103 ends this flowchart.

On the other hand, when it is determined that the NAN device 103 has not received the data communication confirmation signal (step S512: No), since the establishment of the NDL had failed (step S514), the control unit 302 of the NAN device 103 ends this flowchart.

In this flowchart, the Publisher is set to receive the data communication request signal. The configuration is not limited to this, and the Subscriber may receive the data communication request signal. In the aforementioned case, the Subscriber ends this flowchart in a case where the Publish message including the desired service is received. As an alternative configuration, the Subscriber may start this flowchart in a case where the Follow-up message is transmitted to the Publisher, or may also start this flowchart on the basis of the user instruction of the Subscriber.

As in this flowchart, when the data communication based on the communication compliant with the communication standard other than the Wi-Fi NAN standard which is performed by its own apparatus is taken into account when the NAN device establishes the NDL, the interference with the NDL-based data communication can be avoided. Specifically, when the NAN device takes into account the operation channel and the period for performing the data communication of each of the communication compliant with the communication standard other than the Wi-Fi NAN standard and the NDL, it is possible to suppress the decrease in the throughput.

Figure 6:
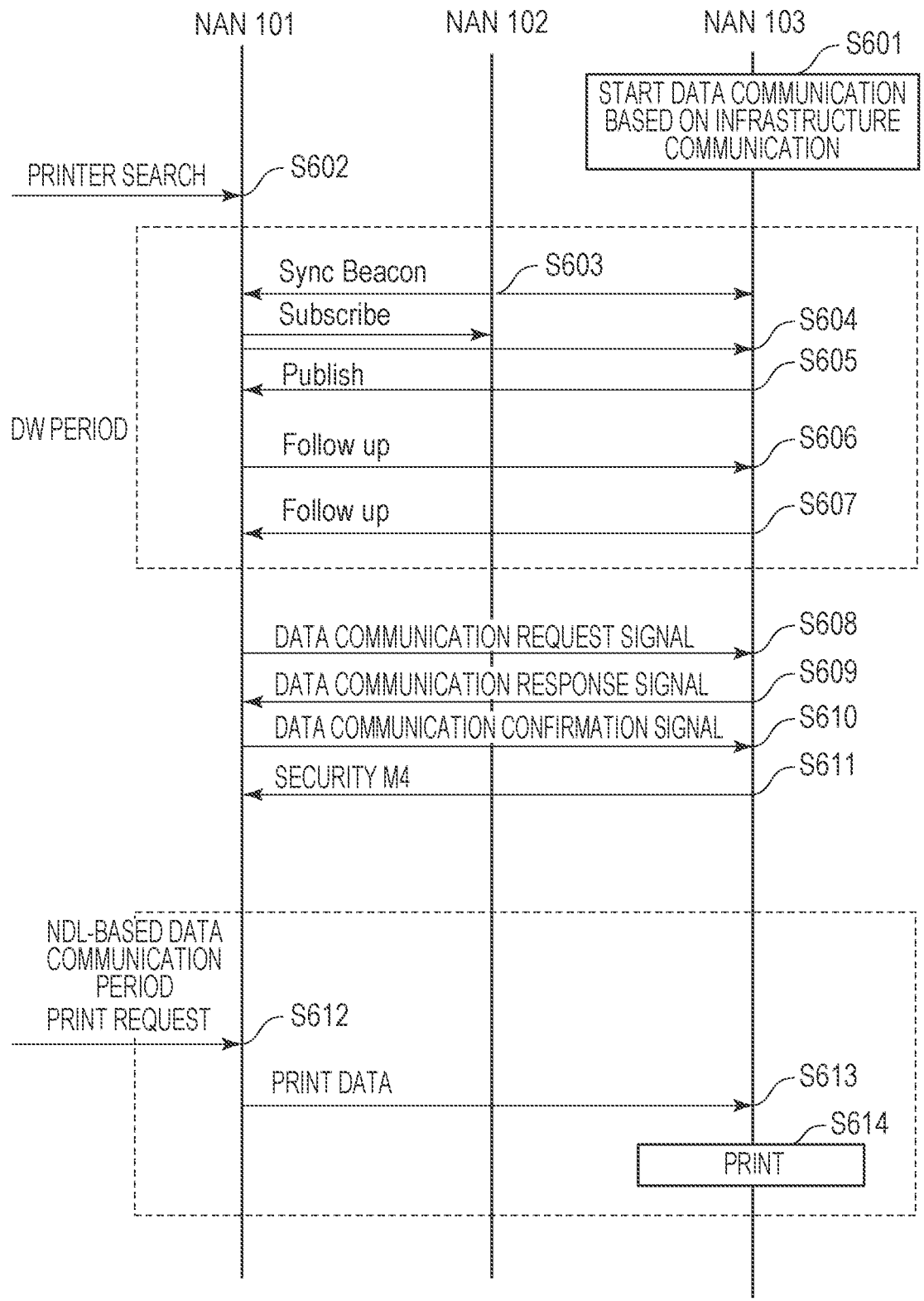
FIG. 6 is a sequence diagram illustrating processing executed when the NAN devices establish the NAN data link.

FIG. 6 is a sequence diagram illustrating processing executed by the NAN device 101, the NAN device 102, and the NAN device 103 when the NAN device 101 and the NAN device 103 establish the NAN data link.

The NAN device 103 starts the data communication based on the communication via the infrastructure network with the AP 104 (step S601). The user of the NAN device 101 instructs a search for the printing service in print application (step S602).

When the DW of the NAN cluster 105 is started, the NAN Synchronization Beacon is transmitted from the NAN device 102 serving as the Master to the NAN device 101 and the NAN device 103 (step S603). To search for the printing service, the NAN device 101 transmits the Subscribe message to the NAN device 102 and the NAN device 103 (step S604). Since the NAN device that has received the Subscribe message 103 can provide the printing service, the Publish message is transmitted to the NAN device 101 (step S605). The NAN device 101 that has received the Publish message transmits the Follow-up message to the NAN device 103, and performs an inquiry for additional information with regard to the printing service (step S606). The NAN device 103 that has received the Follow-up message transmits the additional information with regard to the printing service to the NAN device 101 using the Follow-up message (step S607).

The NAN device 101 starts the processing in FIG. 4, and the NAN device 103 starts the processing in FIG. 5.

The NAN device 101 transmits the data communication request signal to the NAN device 103 (step S608). At this time, since the NAN device 103 is performing the data communication based on the communication via the infrastructure network, the NAN device 101 transmits the data communication request signal including the operation channel and the period where the aforementioned communication is taken into account.

Since the NAN device 103 that has received the data communication request signal can perform the NDL-based data communication in the requested operation channel and period, the NAN device 103 transmits the data communication response signal including the acceptance response to the NAN device 101 (step S609).

Since the acceptance response is included in the response, the NAN device 101 that has received the data communication response signal transmits the data communication confirmation signal to the NAN device 103 (step S610).

When the NAN device 103 receives the data communication response signal, the NDL is established between the NAN device 101 and the NAN device 103 in the operation channel and the period included in the response.

The NAN device 103 that has received the data communication confirmation signal transmits a security M4 message including an encryption key for protecting the NDL-based data communication and a parameter for the security (step S611). It is noted that the NAN device 103 may skip this step.

The NAN device 101 receives a request for printing data from the user (step S612). Since it is within the period for performing the NDL-based data communication, the NAN device 101 transmits the print data to the NAN device 103 as the NDL-based data communication (step S613). The NAN device 103 that has received the print data executes the printing (step S614).

According to the present embodiment, the NAN device has decided the operation channel and the period used in the NDL by taking into account the operation channel and the period used in the communication compliant with the communication standard other than the Wi-Fi NAN standard when the NDL is established. Thus, the NAN device can suppress the occurrence of the operation channel switching when the data communication based on the communication compliant with the communication standard other than the Wi-Fi NAN standard and the NDL-based data communication are switched, and it is possible to suppress the decrease in the throughput. The NAN device can also suppress the power consumption caused while waiting for packet reception by matching the periods for performing the data communications based on the different communications in adjacent periods.

It is noted that the present embodiment at the time of the establishment of the NDL has been described, but the present embodiment can also be applied to an occasion when a communication based on the other Wi-Fi NAN standard is established. For example, the present embodiment may be applied to procedures on an occasion when a distance between the mutual NAN devices is measured and on an occasion when a server is set up by proxy.

Second Embodiment

According to the present embodiment, a case will be described where the NAN device has started the data communication based on the communication compliant with the communication standard other than the Wi-Fi NAN standard after the establishment of the NDL.

The network configuration in which the NAN device 101 according to the present embodiment participates is similar to that of FIG. 1. It is noted that the AP 104 is not performing the data communication based on the communication via the infrastructure network with the NAN device 103.

The functional configurations of the NAN devices 101, 102, and 103 are similar to those of FIG. 2. The hardware configurations of the NAN devices 101, 102, and 103 are similar to those of FIG. 3.

Figure 9:
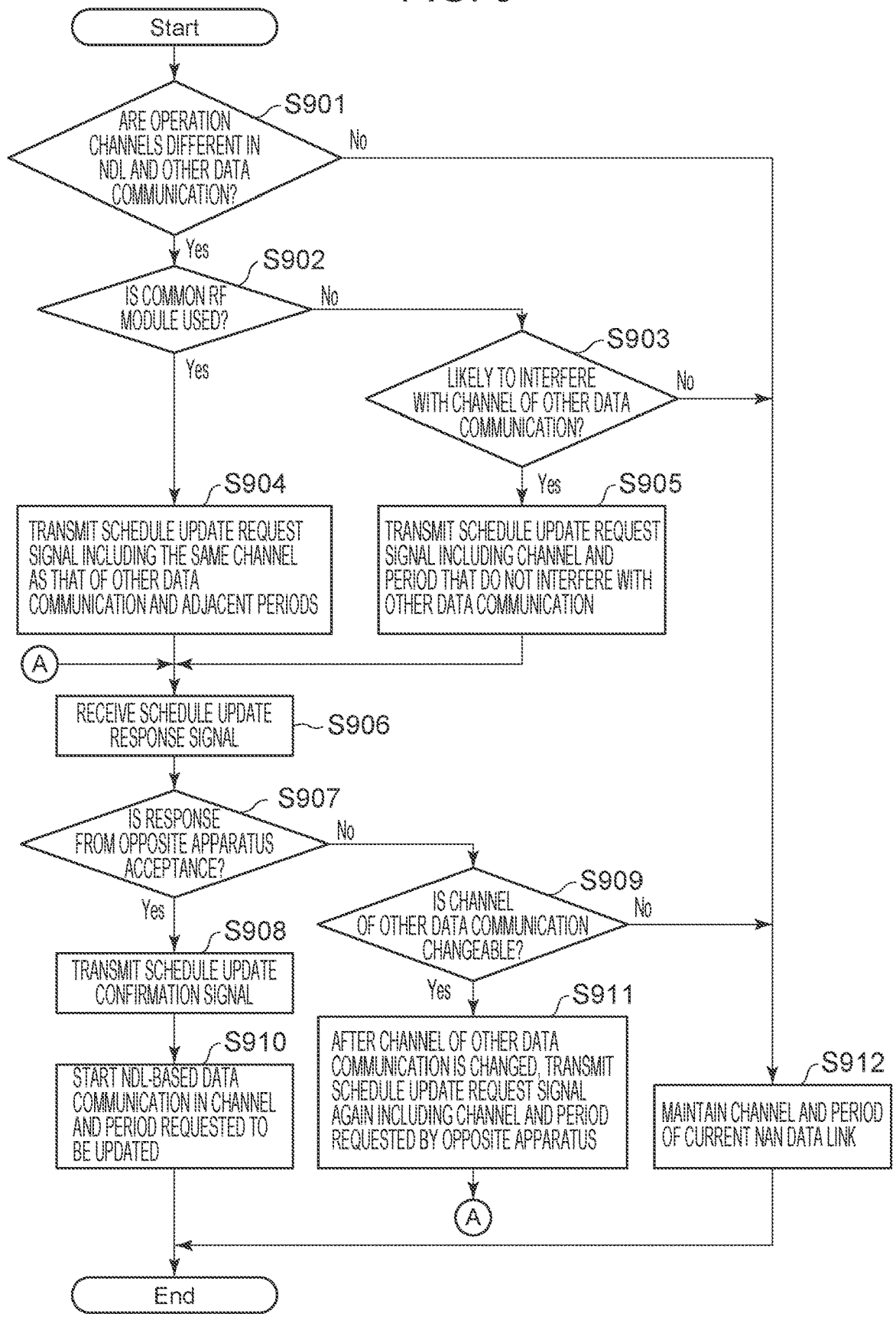
FIG. 9 is a flowchart illustrating processing executed when the NAN device starts another data communication in a case where the NAN device has established the NAN data link.

FIG. 9 is a flowchart illustrating processing realized since the program stored in the storage unit 301 is executed by the control unit 302 when the other data communication is started in a case where the NAN device 103 has established the NAN data link.

This flowchart is started when the NAN device 103 has started the data communication based on the communication compliant with the communication standard other than the Wi-Fi NAN standard in a case where the NAN device 103 has established the NDL with the NAN device 101 and is performing the data communication.

It is noted that the NAN device that performs the processing in this flowchart may be the Subscriber or may also be the Publisher.

The control unit 302 of the NAN device 103 determines whether or not the operation channel used in the communication compliant with the communication standard other than the Wi-Fi NAN standard is different from the operation channel used in the NDL-based data communication (step S901).

In a case where it is determined that the operation channel used in the communication compliant with the communication standard other than the Wi-Fi NAN standard is not different from the operation channel used in the NDL (step S901: No), the control unit 302 of the NAN device 103 performs processing in step S912. It is noted that a case where the operation channel used in the communication compliant with the communication standard other than the Wi-Fi NAN standard is not different from the operation channel used in the NDL-based data communication refers to a case where the two operation channels are the same. The control unit 302 of the NAN device 103 maintains the NDL currently performed in step S912, and ends this flowchart.

On the other hand, in a case where it is determined that the operation channel used in the communication compliant with the communication standard other than the Wi-Fi NAN standard is different from the operation channel used in the NDL (step S901: Yes), the control unit 302 of the NAN device 103 performs processing in step S902. The control unit 302 of the NAN device 103 determines whether or not the common RF module is used in the communication compliant with the communication standard other than the Wi-Fi NAN standard and the communication compliant with the Wi-Fi NAN standard (step S902). This determination is similarly performed as in step S402 in FIG. 4.

When it is determined that the common RF module is used in the communication compliant with the communication standard other than the Wi-Fi NAN standard and the communication compliant with the Wi-Fi NAN standard (step S902: Yes), the control unit 302 of the NAN device 103 performs processing in step S904. The control unit 302 of the NAN device 103 transmits the schedule update request signal to the NAN device 101. It is noted that the configuration of the frame of the schedule update request signal is as illustrated in FIG. 7. The operation channel included in the schedule update request signal in this step is the same operation channel as that of the communication compliant with the communication standard other than the Wi-Fi NAN standard which is performed by the NAN device 103. The period included in the request is periods before and after the period for performing the data communication based on the communication compliant with the communication standard other than the Wi-Fi NAN standard which is performed by the NAN device 103. After the processing in step S904 is performed, the control unit 302 of the NAN device 103 performs processing in step S906.

When it is determined that the common RF module is not used in the communication compliant with the communication standard other than the Wi-Fi NAN standard and the communication compliant with the Wi-Fi NAN standard (step S902: No), the control unit 302 of the NAN device 103 performs processing in step S903. The control unit 302 of the NAN device 103 obtains the operation channel of the NDL and the operation channel of the communication compliant with the communication standard other than the Wi-Fi NAN standard, and determines whether or not the operation channels are likely to interfere with each other (step S903). Specifically, the control unit 302 of the NAN device 103 obtains the operation channel of the NDL performed by the NAN device 103 and the operation channel in which the communication based on the communication standard other than the Wi-Fi NAN standard is performed, and determines whether or not those operation channels interfere with each other. For example, in a case where the operation channel of the NDL is 1 ch, it is determined that the interference is likely to occur when the operation channel other than the Wi-Fi NAN standard is any one of 1 to 5 chs.

When it is determined that the operation channel of the NDL and the operation channel of the communication compliant with the communication standard other than the Wi-Fi NAN standard are unlikely to interfere with each other (step S903: No), the control unit 302 of the NAN device 103 performs the processing in step S912. When it is determined that the operation channel of the NDL and the operation channel of the communication compliant with the communication standard other than the Wi-Fi NAN standard are likely to interfere with each other (step S903: Yes), the control unit 302 of the NAN device 103 performs processing in step S905. The control unit 302 of the NAN device 103 transmits the schedule update request signal to the NAN device 101. The operation channel included in the request is the operation channel that does not interfere with the communication compliant with the communication standard other than the Wi-Fi NAN standard which is performed by the NAN device 103. The period included in the request is the period involving no interference with the period for performing the data communication based on the communication compliant with the communication standard other than the Wi-Fi NAN standard. When the processing in step S905 is performed, the control unit 302 of the NAN device 103 performs the processing in step S906.

The control unit 302 of the NAN device 103 receives the schedule update response signal from the NAN device 101 (step S906). The frame configuration of the schedule update response signal is as illustrated in FIG. 7.

When the schedule update response signal is received, the control unit 302 of the NAN device 103 determines whether or not the response of the NAN device 101 with respect to the schedule update request signal is acceptance (step S907). Specifically, the control unit 302 of the NAN device 103 checks the value of the Type, Status 704 of the schedule update response signal received in step S906. According to the present embodiment, it is determined whether or not the value of the lower 4 bits of the Type, Status 704 is 1. In a case where the response of the NAN device 101 is not acceptance (step S907: No), the control unit 302 of the NAN device 103 determines whether or not the operation channel of the communication compliant with the communication standard other than the Wi-Fi NAN standard can be changed (step S909). The determination is similarly performed as in step S413 of FIG. 4.

When it is determined that the operation channel of the communication compliant with the communication standard other than the Wi-Fi NAN standard is unchangeable (step S909: No), the control unit 302 of the NAN device 103 performs the processing in step S912. On the other hand, when it is determined that the operation channel of the communication compliant with the communication standard other than the Wi-Fi NAN standard is changeable (step S909: Yes), the control unit 302 of the NAN device 103 performs processing in step S911. The processing in step S911 is similar to step S414 in FIG. 4. It is noted that the control unit 302 of the NAN device 103 transmits the schedule update request signal in step S911. When the processing in step S911 is performed, the control unit 302 of the NAN device 103 performs the processing in step S906.

On the other hand, in step S907, in a case where the response of the NAN device 101 is acceptance (step S907: Yes), the control unit 302 of the NAN device 103 transmits the schedule update confirmation signal to the NAN device 101 (step S908). The control unit 302 of the NAN device 103 then starts the NDL-based data communication with the NAN device 101 using the operation channel and the period included in the schedule update confirmation signal (step S910), and ends this flowchart.

Figure 10:
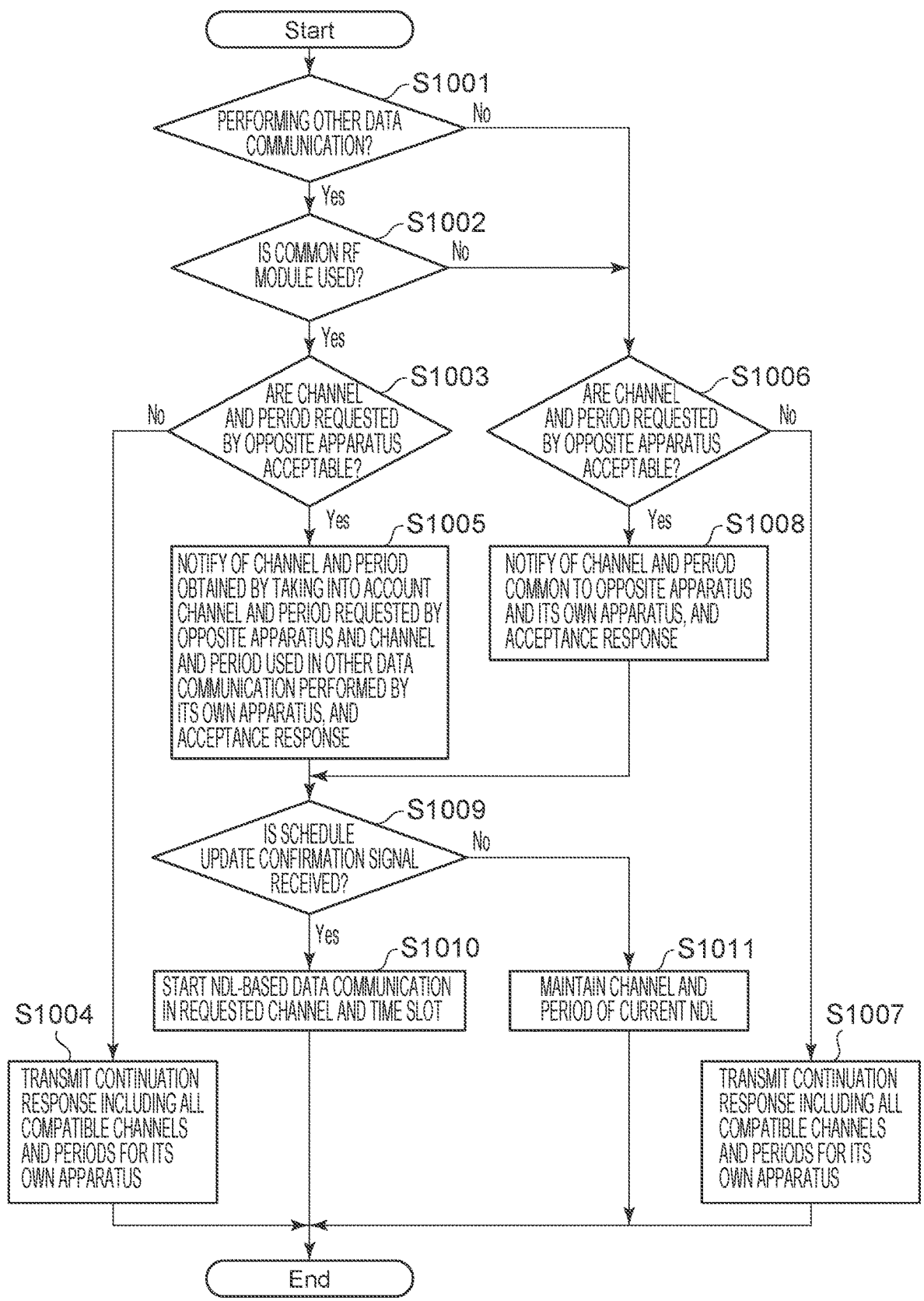
FIG. 10 is a flowchart illustrating processing executed when an opposite apparatus starts another data communication in a case where the NAN device has established the NAN data link.

FIG. 10 is a flowchart illustrating processing realized since the program stored in the storage unit 301 is executed by the control unit 302 when the opposite apparatus starts the other data communication in a case where the NAN device 101 has established the NAN data link.

This flowchart is started when the schedule update request signal is received from the NAN device 101 in a case where the NAN device 101 has established the NDL with the NAN device 103 and is performing the data communication.

It is noted that the NAN device that performs the processing in this flowchart may be the Subscriber or may also be the Publisher.

The control unit 302 of the NAN device 101 determines whether or not the NAN device 101 is performing the data communication based on the communication compliant with the communication standard other than the Wi-Fi NAN standard (step S1001). In a case where it is determined that the NAN device 101 is not performing the data communication based on the communication compliant with the communication standard other than the Wi-Fi NAN standard (step S1001: No), the control unit 302 of the NAN device 101 performs processing in step S1006.

On the other hand, in a case where it is determined that the NAN device 101 is performing the data communication based on the communication compliant with the communication standard other than the Wi-Fi NAN standard (step S1001: Yes), the control unit 302 of the NAN device 101 performs processing in step S1002. The control unit 302 of the NAN device 101 determines whether or not the common RF module is used in the communication compliant with the Wi-Fi NAN standard and the communication compliant with the communication standard other than the Wi-Fi NAN standard (step S1002). This step is similar to step S902 in FIG. 9. When it is determined that the common RF module is not used (step S1002: No), the control unit 302 of the NAN device 101 performs the processing in step S1006.

When it is determined that the common RF module is used (step S1002: Yes), the control unit 302 of the NAN device 101 performs processing in step S1003. The control unit 302 of the NAN device 101 determines whether or not the operation channel and the period included in the received schedule update request signal are acceptable (step S1003). This determination is similarly performed as in step S506 in FIG. 5. When it is determined that the operation channel and the period included in the received schedule update request signal are not acceptable (step S1003: No), the control unit 302 of the NAN device 101 performs processing in step S1004. The processing in step S1004 is processing similar to step S507 in FIG. 5. It is noted that the control unit 302 of the NAN device 101 transmits the schedule update response signal in step S1004.

When it is determined that the operation channel and the period included in the received schedule update request signal are acceptable (step S1003: Yes), the control unit 302 of the NAN device 101 performs processing in step S1005. The processing in step S1005 is similar to the processing in step S508 in FIG. 5. It is noted that the control unit 302 of the NAN device 101 transmits the schedule update response signal in step S1005. The control unit 302 of the NAN device 101 which has performed the processing in step S1005 performs processing in step S1009.

In step S1006, the control unit 302 of the NAN device 101 determines whether or not the operation channel and the period included in the received schedule update request signal are acceptable. When it is determined that the operation channel and the period included in the received schedule update request signal are not acceptable (step S1006: No), the control unit 302 of the NAN device 101 performs processing in step S1007. The processing in step S1007 is similar to the processing in step S510 in FIG. 5. It is noted that the control unit 302 of the NAN device 101 transmits the schedule update response signal in step S1007.

When it is determined that the operation channel and the period included in the received schedule update request signal are acceptable (step S1006: Yes), the control unit 302 of the NAN device 101 performs processing in step S1008. The processing in step S1008 is similar to step S511 in FIG. 5. It is noted that the control unit 302 of the NAN device 101 transmits the schedule update response signal in step S1008. The control unit 302 of the NAN device 101 that has performed the processing in step S1008 performs the processing in step S1009.

The control unit 302 of the NAN device 101 determines whether or not the schedule update confirmation signal is received (step S1009). When it is determined that the schedule update confirmation signal is received (step S1009: Yes), the control unit 302 of the NAN device 101 starts the NDL-based data communication using the operation channel and the period included in the schedule update confirmation signal (step S1010). The control unit 302 of the NAN device 101 then ends this flowchart. On the other hand, when it is determined that the schedule update confirmation signal is not received (step S1009: No), the control unit 302 of the NAN device 101 maintains the NDL-based data communication currently performed with the NAN device 103 (step S1011). The control unit 302 of the NAN device 101 then ends this flowchart.

Figure 11:
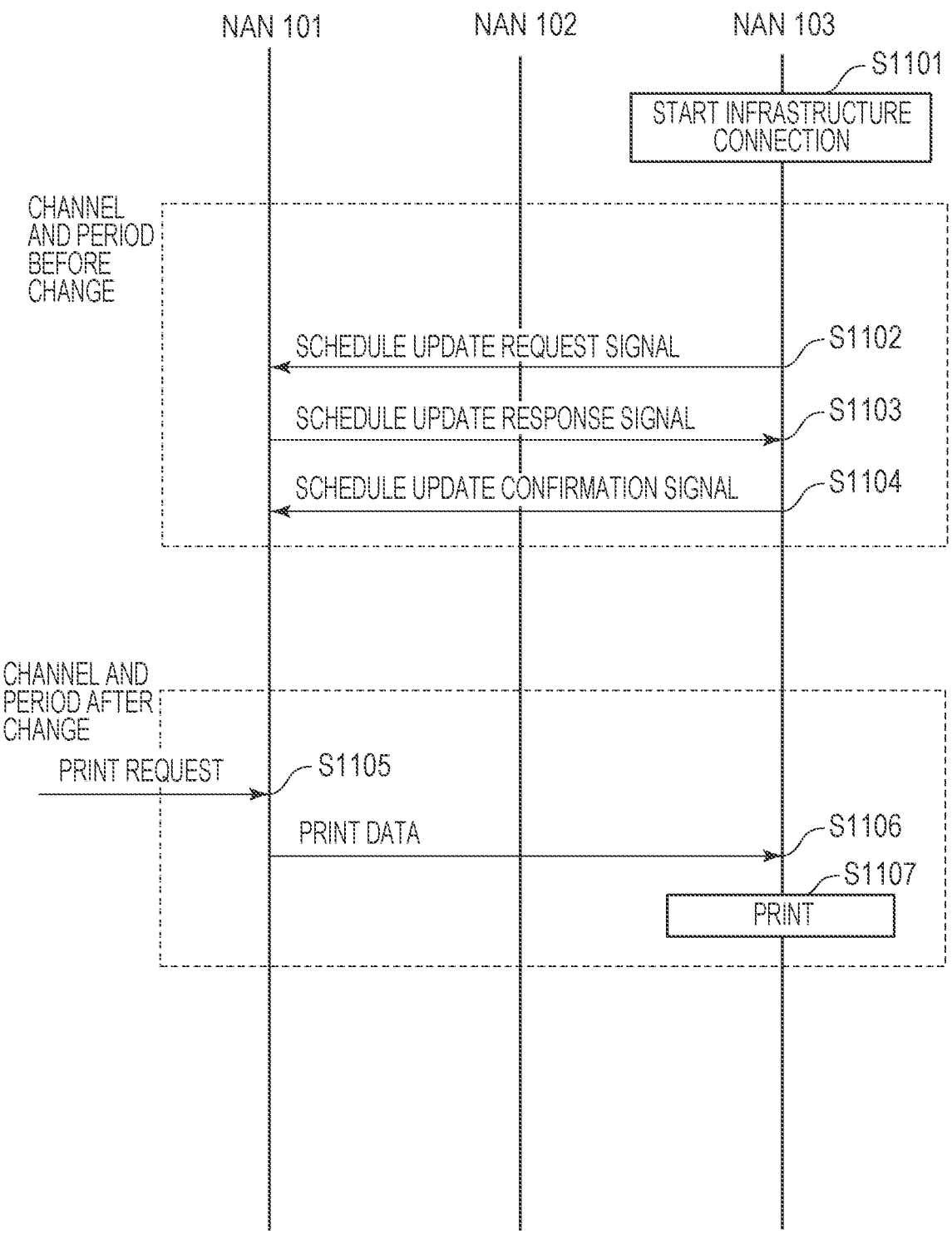
FIG. 11 is a sequence diagram illustrating processing executed when the NAN devices start another data communication in a case where the NAN devices have established the NAN data link.

FIG. 11 is a sequence diagram illustrating processing executed when the other data communication is started in a case where the NAN device 101 and the NAN device 103 have established the NAN data link.

In this flowchart, the NAN device 101 and the NAN device 103 are performing the NDL-based data communication.

The NAN device 103 starts the communication via the infrastructure network as the communication compliant with the communication standard other than the Wi-Fi NAN standard (step S1101). The NAN device 103 determines whether or not the operation channel of the NDL with the NAN device 101 is to be changed in accordance with the flowchart of FIG. 9. In this sequence, the NAN device 103 is set to use the common RF module in the communication compliant with the Wi-Fi NAN standard and the communication compliant with the communication standard other than the Wi-Fi NAN standard.

The NAN device 103 transmits the schedule update request signal to the NAN device 101 to change the operation channel of the NDL-based data communication (step S1102). The NAN device that has received the schedule update request signal 101 determines whether or not the operation channel and the period included in the request are acceptable. The NAN device 101 determines that the operation channel and the period included in the request are acceptable, and transmits the schedule update response signal including the acceptance response to the NAN device 103 (step S1103). On the basis of the reception of the acceptance response, the NAN device 103 transmits the schedule update confirmation signal to the NAN device 101 (step S1104).

The NAN device 101 and the NAN device 103 start the NDL-based data communication using the operation channel and the period included in the schedule update confirmation signal.

The NAN device 101 receives a request for printing data from the user (step S1105). Since it is within the period for performing the NDL-based data communication, the NAN device 101 transmits the print data to the NAN device 103 as the NDL-based data communication (step S1106). The NAN device 103 that has received the print data executes the printing (step S1107).

According to the present embodiment, in a case where the NAN device that is performing the NDL-based data communication starts the data communication based on the communication compliant with the communication standard other than the Wi-Fi NAN standard, the operation channel and the period of the NDL are changed by taking into account the operation channel and the period of the aforementioned communication. Since the operation channel and the period of the already established NDL are changed, when the data communication based on the communication compliant with the communication standard other than the Wi-Fi NAN standard and the NDL-based data communication are switched, the occurrence of the operation channel switching can be suppressed. Thus, it is possible to suppress the decrease in the throughput. In addition, it is possible to suppress the decrease in the throughput which is caused while waiting for packet reception by matching the periods for performing the data communications based on the different communications in adjacent periods.

It is noted that according to the first embodiment and the second embodiment, the communication compliant with the Wi-Fi NAN standard may include not only the NDL-based data communication performed outside the DW but also the communication performed during the DW. The communication compliant with the communication standard other than the Wi-Fi NAN standard may include the communication established by the Post NAN.

It is noted that according to the first embodiment and the second embodiment, a case is supposed where the NAN device has set the operation channel in the NDL and the communication compliant with the communication standard other than the Wi-Fi NAN standard as a different operation channel from the communication compliant with the Wi-Fi NAN standard during the DW. In the above-described case, the NAN device may exit from the participating NAN cluster while the NDL-based data communication is continued. Thus, the NAN device no longer needs to transmit or receive signals during the DW. Therefore, the operation channel no longer needs to be switched between the communication performed during the DW and the NDL and the communication compliant with the communication standard other than the Wi-Fi NAN standard, and the throughput is improved.

According to the first embodiment and the second embodiment, the operation channel and the period for performing the data communication of each of the communication compliant with the communication standard other than the Wi-Fi NAN standard and the NDL are taken into account. However, the configuration is not limited to this, and only the operation channel may be simply taken into account. Specifically, in a case where the NAN device is performing the communication compliant with the Wi-Fi NAN standard and the communication compliant with the communication standard other than the Wi-Fi NAN standard using the common RF module, the NAN device may take into account whether or not the operation channels of the two communications are the same. As an alternative configuration, these communications are performed using different RF modules, the NAN device may take into account whether or not the operation channels of the respective communications do not mutually interfere.

According to the first embodiment and the second embodiment, in a case where the NDL-based data communication and the data communication based on the communication compliant with the communication standard other than the Wi-Fi NAN standard are performed, the NAN device 101 changes the operation channel of one of the data communications. However, the NDL-based data communication is performed in multicast, the NAN device 101 does not need to change any of the operation channels of the data communications. For example, in a case where the NAN device 101 is performing the NDL-based data communication in multicast, it is assumed that the NAN device 101 has started the data communication based on the communication compliant with the communication standard other than the Wi-Fi NAN standard. In this case, the NAN device 101 does not need to change any of the operation channels of the NDL-based data communication and the communication compliant with the communication standard other than the Wi-Fi NAN standard. In addition, for example, in a case where the opposite apparatus with which the NAN device 101 is performing the data communication using the NDL is an apparatus (source device) that transmits data in multicast, it is assumed that the NAN device 101 has started the communication compliant with the communication standard other than the Wi-Fi NAN standard. In this case, the NAN device 101 may prioritize the operation channel of the NDL-based data communication over the operation channel of the communication compliant with the communication standard other than the Wi-Fi NAN standard which is started by its own apparatus. Specifically, in a case where the NAN device 101 can change the operation channel of the communication compliant with the communication standard other than the Wi-Fi NAN standard, the operation channel of the communication may be changed so as to be the same as the operation channel of the NDL-based data communication. It is noted that in a case where the NAN device 101 is not to change the operation channel of the communication compliant with the communication standard other than the Wi-Fi NAN standard, a configuration may be adopted where the NAN device 101 does not change the operation channel of any of the aforementioned communication and the NDL-based data communication. It is noted that the same also applies in a case where the NAN device 103 is performing the NDL-based data communication in multicast.

According to the first embodiment, a case is supposed where the NAN device 101 is performing a plurality of communications compliant with the communication standard other than the Wi-Fi NAN standard. In this case, when the operation channel is taken into account, the NAN device 101 sets the operation channel of the communication compliant with the communication standard other than the Wi-Fi NAN standard where the data communication amount is high and the operation channel of the NDL-based data communication to be the same. As an alternative configuration, the NAN device 101 may set the operation channel of the communication compliant with the communication standard other than the Wi-Fi NAN standard where the data communication time is long and the operation channel of the NDL-based data communication to be the same. It is noted that the same also applies in a case where the NAN device 103 is performing a plurality of communications compliant with the communication standard other than the Wi-Fi NAN standard.

In addition, according to the second embodiment, a case is supposed where the communication compliant with a communication standard different from the aforementioned communication standard is started when the NAN device 101 is performing the communication compliant with the communication standard other than the Wi-Fi NAN standard and the NDL-based data communication. In this case, the NAN device 101 sets the operation channel of the NDL-based data communication to be the same as the operation channel of the communication compliant with the communication standard other than the Wi-Fi NAN standard where the data communication amount is high. As an alternative configuration, the NAN device 101 may set the operation channel of the NDL-based data communication to be the same operation channel as that of the communication compliant with the communication standard other than the Wi-Fi NAN standard where the data communication time is long. It is noted that in a case where information such as the data communication amount or the data communication time with regard to the communication compliant with the communication standard other than the Wi-Fi NAN standard which is newly started by the NAN device 101 is not obtained, a configuration may be adopted that the operation channels are not matched with each other. It is noted that the same also applies in a case where the NAN device 103 is performing the communication compliant with the communication standard other than the Wi-Fi NAN standard and the NDL-based data communication.

The establishment of the one-to-one NAN data link has been illustrated according to the first embodiment and the second embodiment, but similar establishment may be performed with respect to a plurality of NAN devices. In the case of the first embodiment, the NAN data link may be established by the plurality of NAN devices at the same time. Alternatively, the method illustrated in the first embodiment may be sequentially performed by one device each. In the case of the second embodiment, the changes of the operation channels and the periods with regard to the plurality of terminals are desired, and in a case where even any one of the terminals has rejected, the changes of the operation channels and the periods may be suspended at that time. Thus, even in a case where the changes of the operation channels and the periods are desired, the changes of the operation channels and the periods can be suspended depending on balancing with the other terminals. Thus, dispersions of the operation channels and the periods are avoided even in a case where the NDL-based data communications are performed with the plurality of terminals, and the communications in an energy efficient manner can be realized.

It is noted that according to the first embodiment and the second embodiment, the communication compliant with the communication standard other than the Wi-Fi NAN standard is set as the communication based on the different wireless communication method compliant with the IEEE802.11 series standard other than the Wi-Fi NAN standard. However, the configuration is not limited to this, and the communication compliant with the communication standard other than the Wi-Fi NAN standard may also be the other wireless communication as long as the communication is a wireless communication that can use the same operation channel as the operation channel used in the communication compliant with the Wi-Fi NAN standard.

It is noted that at least a part or all of the flowcharts for the NAN device illustrated in FIG. 4, FIG. 5, FIG. 9, and FIG. 10 may be realized by hardware. In a case where the flowchart is realized by the hardware, for example, a dedicated-use circuit may be generated on an FPGA from programs for realizing respective steps by using a predetermined compiler, and this may be used. FPGA is an abbreviation of a field programmable gate array. Similarly as in the FPGA, a gate array circuit may be formed and realized as hardware. This may also be realized by an application specific integrated circuit (ASIC). The same also applies in the sequence diagrams illustrated in FIG. 6 and FIG. 11.

The flowcharts illustrated in FIG. 4, FIG. 5, FIG. 9, and FIG. 10 and the respective steps in the sequence diagrams illustrated in FIG. 6 and FIG. 11 may also be distributed and performed by a plurality of CPUs or apparatuses which are not illustrated in the drawings.

The embodiments have been described above in detail, but for example, the present invention can take an embodiment mode as a system, an apparatus, a method, a program, a recording medium (storage medium), or the like. Specifically, the embodiment may be applied to a system constituted by a plurality of devices (for example, host computers, interface devices, imaging apparatuses, web applications, and the like), or may also be applied to an apparatus constituted by a single device.

The present invention can also be realized by processing in which the programs for realizing one or more functions according to the above-described embodiments are supplied to a system or an apparatus via a network or a storage medium, and one or more processors in the system or the apparatus read out the programs to be executed. The present invention can also be realized by a circuit (for example, the ASIC) that realizes one or more functions.

In accordance with the present invention, it is possible to suppress the decrease in the throughput in the communication apparatus that performs the data communications in both the communication compliant with Wi-Fi NAN standard and the communication compliant with the other communication standard.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   a first communication unit configured to operate in a first operation channel in a case where the communication apparatus participates in a NAN cluster compliant with a Wi-Fi Neighbor Awareness Network (NAN) standard, and perform a NAN data link communication compliant with the Wi-Fi NAN standard with a first other communication apparatus outside a Discovery Window (DW);
   a second communication unit configured to operate in a second operation channel, and perform a data communication compliant with a communication standard other than the Wi-Fi NAN standard with a second other communication apparatus; and
   a control unit configured to set the first operation channel and the second operation channel to be the same in a case where the communication apparatus performs the NAN data link communication by the first communication unit and the data communication by the second communication unit in parallel.

2. The communication apparatus according to claim 1, wherein the control unit sets the first operation channel to be the same as the second operation channel by selecting an operation channel used as the second operation channel by the second communication unit as the first operation channel in a case where the data communication by the second communication unit is performed and the NAN data link communication by the first communication unit is to be started.

3. The communication apparatus according to claim 2, further comprising:
a first transmission unit configured to transmit a communication request signal for requesting start of the NAN data link communication by the first communication unit to the first other communication apparatus,
wherein the control unit includes the second operation channel in the communication request signal and transmits the communication request signal by the first transmission unit in a case where the data communication by the second communication unit is performed and the NAN data link communication by the first communication unit is to be started.

4. The communication apparatus according to claim 3, further comprising:
a first reception unit configured to receive a communication response signal serving as a response to the communication request signal transmitted by the first transmission unit from the first other communication apparatus,
wherein the NAN data link communication by the first communication unit is performed using the second operation channel in a case where the communication response signal received by the first reception unit indicates acceptance.

5. The communication apparatus according to claim 4, wherein the control unit sets the second operation channel to be the same as the first operation channel, and transmits the communication request signal including the first operation channel by the first transmission unit in a case where the communication response signal received by the first reception unit indicates continuation and the communication apparatus can change the second operation channel.

6. The communication apparatus according to claim 4, wherein the first transmission unit transmits the communication request signal including the second operation channel in a case where the communication response signal received by the first reception unit indicates continuation and the communication apparatus is not to change the second operation channel.

7. The communication apparatus according to claim 1, wherein the control unit sets the first operation channel to be the same as the second operation channel by changing an operation channel used as the first operation channel by the first communication unit to an operation channel used as the second operation channel used by the second communication unit in a case where the NAN data link communication by the first communication unit is performed and the data communication by the second communication unit is started.

8. The communication apparatus according to claim 7, further comprising:
a second transmission unit configured to transmit an update request signal for requesting update of the NAN data link communication by the first communication unit to the first other communication apparatus,
wherein the control unit includes the second operation channel in the update request signal, and transmits the update request signal by the second transmission unit in a case where the NAN data link communication by the first communication unit is performed and the data communication by the second communication unit is started.

9. The communication apparatus according to claim 8, further comprising:
a second reception unit configured to receive an update response signal serving as a response to the update request signal transmitted by the second transmission unit from the first other communication apparatus,
wherein the NAN data link communication by the first communication unit is performed using the second operation channel in a case where the update response signal received by the second reception unit indicates acceptance.

10. The communication apparatus according to claim 9, wherein the control unit sets the second operation channel to be the same as the first operation channel, and the second transmission unit transmits the update request signal including the first operation channel in a case where the update response signal received by the second reception unit does not indicate acceptance, and the communication apparatus can change the second operation channel.

11. The communication apparatus according to claim 1, wherein the control unit sets the second operation channel to be the same as the first operation channel by changing an operation channel used as the second operation channel by the second communication unit to an operation channel used as the first operation channel by the first communication unit in a case where the NAN data link communication by the first reception unit is performed and the data communication by the second communication unit is started.

12. The communication apparatus according to claim 1, wherein the control unit sets the second operation channel to be the same as the first operation channel by changing an operation channel used as the second operation channel by the second communication unit to an operation channel used as the first operation channel by the first communication unit in a case where the data communication by the second communication unit is performed and the NAN data link communication by the first communication unit is started.

13. The communication apparatus according to claim 1, further comprising:
a third communication unit configured to operate in a third operation channel in a case where the communication apparatus participates in the NAN cluster compliant with the Wi-Fi NAN standard, and perform a communication compliant with the Wi-Fi NAN standard with the first other communication apparatus during the DW.

14. The communication apparatus according to claim 13, wherein the control unit sets the first operation channel, the second operation channel, and the third operation channel to be the same in a case where the communication apparatus is performing the communication by the third communication unit and is further performing the NAN data link communication by the first communication unit and the data communication by the second communication unit in parallel.

15. The communication apparatus according to claim 1, wherein the second communication unit operates in the second operation channel, and performs a data communication based on an Infrastructure network compliant with an IEEE802.11 series standard.

16. The communication apparatus according to claim 1, wherein the second communication unit operates in the second operation channel, and performs a data communication compliant with a Wi-Fi Direct standard.

17. The communication apparatus according to claim 1, wherein the second communication unit operates in the second operation channel, and performs a data communication compliant with a Wi-Fi IBSS standard.

18. A control method for a communication apparatus, the control method comprising:
- performing a first communication process for operating in a first operation channel in a case where the communication apparatus participates in a NAN cluster compliant with a Wi-Fi NAN standard, and performing a NAN data link communication compliant with the Wi-Fi NAN standard with a first other communication apparatus outside a DW;
- performing a second communication process for operating in a second operation channel, and performing a data communication compliant with a communication standard other than the Wi-Fi NAN standard with a second other communication apparatus; and
- setting the first operation channel and the second operation channel to be the same in a case where the communication apparatus performs the NAN data link communication in the first communication process and the data communication in the second communication process in parallel.

19. A non-transitory computer-readable storage medium storing a program for causing a computer to perform control of a communication apparatus, the program causes the computer to:
- performing a first communication process for operating in a first operation channel in a case where the communication apparatus participates in a NAN cluster compliant with a Wi-Fi NAN standard, and performing a NAN data link communication compliant with the Wi-Fi NAN standard with a first other communication apparatus outside a DW;
- performing a second communication process for operating in a second operation channel, and performing a data communication compliant with a communication standard other than the Wi-Fi NAN standard with a second other communication apparatus; and
- setting the first operation channel and the second operation channel to be the same in a case where the communication apparatus performs the NAN data link communication in the first communication process and the data communication in the second communication process in parallel.

* * * * *